(12) United States Patent
McCormack et al.

(10) Patent No.: US 7,336,283 B2
(45) Date of Patent: Feb. 26, 2008

(54) EFFICIENT HARDWARE A-BUFFER USING THREE-DIMENSIONAL ALLOCATION OF FRAGMENT MEMORY

(75) Inventors: Joel James McCormack, Boulder, CO (US); Norman P. Jouppi, Palo Alto, CA (US); Larry Dean Seiler, Boylston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 10/280,721

(22) Filed: Oct. 24, 2002

(65) Prior Publication Data

US 2004/0080512 A1   Apr. 29, 2004

(51) Int. Cl.
*G06F 12/02* (2006.01)
(52) U.S. Cl. .................................. 345/543; 345/544
(58) Field of Classification Search ............. 345/544, 345/611, 543; 711/153, 170–173
See application file for complete search history.

(56) References Cited

U.S. PATENT DOCUMENTS

| 6,204,859 B1 * | 3/2001 | Jouppi et al. ............. 345/592 |
| 6,704,026 B2 * | 3/2004 | Kurihara et al. .......... 345/629 |
| 6,965,980 B2 * | 11/2005 | Champion .................. 711/217 |
| 2005/0231526 A1 * | 10/2005 | MacInnis et al. .......... 345/592 |

* cited by examiner

*Primary Examiner*—Chante Harrison

(57) ABSTRACT

A method and apparatus for arranging fragments in a graphics memory. Each pixel of a display has a corresponding list of fragments in the graphics memory. Each fragment describes a three-dimensional surface at a plurality of sample points associated with the pixel. A predetermined number of fragments are statically allocated to each pixel. Additional space for fragment data is dynamically allocated and deallocated. Each dynamically allocated unit of memory contains fragment data for a plurality of pixels. Fragment data are arranged to exploit modern DRAM capabilities by increasing locality of reference within a single DRAM page, by putting other fragments likely to be referenced soon in pages that belong to non-conflicting banks, and by maintaining bookkeeping structures that allow the relevant DRAM precharge and row activate operations to be scheduled far in advance of access to fragment data.

14 Claims, 21 Drawing Sheets

| Red | Green | Blue | Alpha | Z depth | Sample mask | |
|---|---|---|---|---|---|---|
| 1.0 | 0.0 | 0.0 | 1.0 | 14 | 00000111 | 210 |
| 0.0 | 1.0 | 1.0 | 0.5 | 92 | 01001000 | 220 |
| 1.0 | 1.0 | 0.0 | 1.0 | 108 | 11101000 | 230 |

| | | | | | | | |
|---|---|---|---|---|---|---|---|
| A | B | C | D | A | B | C | D |
| C | D | A | B | C | D | A | B |
| A | B | C | D | A | B | C | D |
| C | D | A | B | C | D | A | B |
| B | C | D | A | B | C | D | A |
| D | A | B | C | D | A | B | C |
| B | C | D | A | B | C | D | A |
| D | A | B | C | D | A | B | C |
| A | B | C | D | A | B | C | D |
| C | D | A | B | C | D | A | B |
| A | B | C | D | A | B | C | D |
| C | D | A | B | C | D | A | B |
| B | C | D | A | B | C | D | A |
| D | A | B | C | D | A | B | C |
| B | C | D | A | B | C | D | A |
| D | A | B | C | D | A | B | C |

Figure 8A

| | | | | | | | | |
|---|---|---|---|---|---|---|---|---|
| A | B | C | D | A | B | C | D | A | B |
| C | D | A | B | C | D | A | B | C | D |
| A | B | C | D | A | B | C | D | A | B |
| C | D | A | B | C | D | A | B | C | D |
| B | C | D | A | B | C | D | A | B | C |
| D | A | B | C | D | A | B | C | D | A |
| B | C | D | A | B | C | D | A | B | C |
| D | A | B | C | D | A | B | C | D | A |
| A | B | C | D | A | B | C | D | A | B |
| C | D | A | B | C | D | A | B | C | D |

Figure 8B

| | | | | | | | | | | | | | |
|---|---|---|---|---|---|---|---|---|---|---|---|---|---|
| A | B | C | D | A | B | C | D | A | B | C | D | A | B |
| C | D | A | B | C | D | A | B | C | D | A | B | C | D |
| A | B | C | D | A | B | C | D | A | B | C | D | A | B |
| C | D | A | B | C | D | A | B | C | D | A | B | C | D |
| B | C | D | A | B | C | D | A | B | C | D | A | B | C |
| D | A | B | C | D | A | B | C | D | A | B | C | D | A |
| B | C | D | A | B | C | D | A | B | C | D | A | B | C |
| D | A | B | C | D | A | B | C | D | A | B | C | D | A |
| A | B | C | D | A | B | C | D | A | B | C | D | A | B |
| C | D | A | B | C | D | A | B | C | D | A | B | C | D |

Figure 8C

|   | 825 |   | 830 |   |   | 820 | 835 |   |   |
|---|---|---|---|---|---|---|---|---|---|
| A | A | A | A | B | B | B | B | C | C |
| A | A | A | A | B | B | B | B | C | C |
| A | A | A | A | B | B | B | B | C | C |
| A | A | A | A | B | B | B | B | C | C |
| C | C | C | C | D | D | D | D | A | A |
| C | C | C | C | D | D | D | D | A | A |
| C | C | C | C | D | D | D | D | A | A |
| C | C | C | C | D | D | D | D | A | A |
| B | B | B | B | C | C | C | C | D | D |
| B | B | B | B | C | C | C | C | D | D |

Figure 8D

| A | A | A | A | B | B | B | B | C | C | C | C | D | D | D | D | A | A |
|---|---|---|---|---|---|---|---|---|---|---|---|---|---|---|---|---|---|
| A | A | A | A | B | B | B | B | C | C | C | C | D | D | D | D | A | A |
| A | A | A | A | B | B | B | B | C | C | C | C | D | D | D | D | A | A |
| A | A | A | A | B | B | B | B | C | C | C | C | D | D | D | D | A | A |
| C | C | C | C | D | D | D | D | A | A | A | A | B | B | B | B | C | C |
| C | C | C | C | D | D | D | D | A | A | A | A | B | B | B | B | C | C |
| C | C | C | C | D | D | D | D | A | A | A | A | B | B | B | B | C | C |
| C | C | C | C | D | D | D | D | A | A | A | A | B | B | B | B | C | C |
| B | B | B | B | C | C | C | C | D | D | D | D | A | A | A | A | B | B |
| B | B | B | B | C | C | C | C | D | D | D | D | A | A | A | A | B | B |

Figure 8E

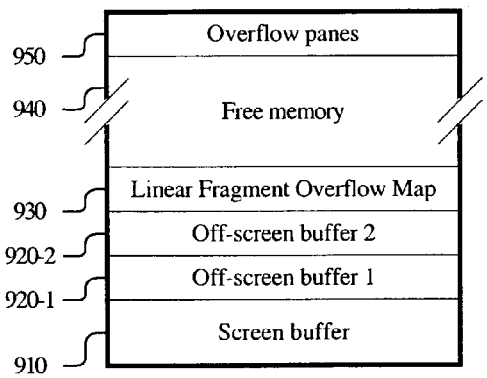
Figure 9
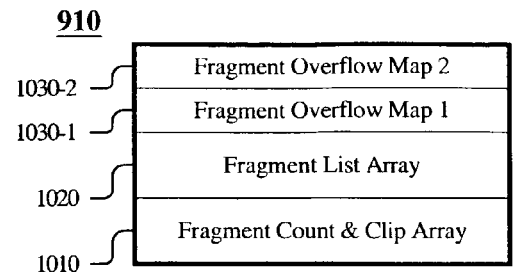
Figure 10
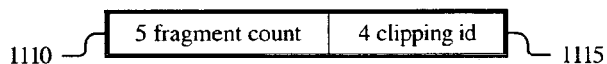
Figure 11
| 8 red | 8 green | 8 blue | 8 alpha | 32 Z | 8 mask |
|---|---|---|---|---|---|
| 8 red | 8 green | 8 blue | 8 alpha | 32 Z | 8 mask |
Figure 12A
| 8 red | 8 green | 8 blue | 8 alpha | 32 Z | | | | 8 mask |
|---|---|---|---|---|---|---|---|---|
| 8 stncl | 8 $\Delta Z_x$ | 8 $\Delta Z_y$ | 8 red | 8 green | 8 blue | 8 stncl | 8 $\Delta Z_x$ | 8 $\Delta Z_y$ |
| 8 red | 8 green | 8 blue | 8 alpha | 32 Z | | | | 8 mask |
| 8 stncl | 8 $\Delta Z_x$ | 8 $\Delta Z_y$ | 8 alpha | 32 Z | | | | 8 mask |
Figure 12B

| 0 4 | 0 12 | 2 6 | 2 14 | 4 8 | 4 0 | 6 10 | 6 2 |
|---|---|---|---|---|---|---|---|
| 16 20 | 16 28 | 18 22 | 18 30 | 20 24 | 20 16 | 22 26 | 22 18 |
| 8 12 | 8 4 | 10 14 | 10 6 | 12 0 | 12 8 | 14 2 | 14 10 |
| 24 28 | 24 20 | 26 30 | 26 22 | 28 16 | 28 24 | 30 18 | 30 26 |
| 1 5 | 1 13 | 3 7 | 3 15 | 5 9 | 5 1 | 7 11 | 7 3 |
| 17 21 | 17 29 | 19 23 | 19 31 | 21 25 | 21 17 | 23 27 | 23 19 |
| 9 13 | 9 5 | 11 15 | 11 7 | 13 1 | 13 9 | 15 3 | 15 11 |
| 25 29 | 25 21 | 27 31 | 27 23 | 29 17 | 29 25 | 31 19 | 31 27 |

Figure 19A

| 0 2 | 0 6 | 2 4 | 2 0 | 4 6 | 4 2 | 6 0 | 6 4 |
|---|---|---|---|---|---|---|---|
| 8 10 | 8 14 | 10 12 | 10 8 | 12 14 | 12 10 | 14 8 | 14 12 |
| 3 5 | 3 1 | 5 7 | 5 3 | 7 1 | 7 5 | 1 3 | 1 7 |
| 11 13 | 11 9 | 13 15 | 13 11 | 15 9 | 15 13 | 9 11 | 9 15 |

Figure 19B

| 0 1 | 0 3 | 3 2 | 3 0 |
|---|---|---|---|
| 2 3 | 2 1 | 1 0 | 1 2 |

Figure 19C

| | | | | | | | |
|---|---|---|---|---|---|---|---|
| 0<br>4 | 0<br>6 | 4<br>8 | 4<br>10 | 8<br>12 | 8<br>14 | 12<br>0 | 12<br>2 |
| 0<br>8 | 0<br>10 | 4<br>12 | 4<br>14 | 8<br>0 | 8<br>2 | 12<br>4 | 12<br>6 |
| 16<br>20 | 16<br>22 | 20<br>24 | 20<br>26 | 24<br>28 | 24<br>30 | 28<br>16 | 28<br>18 |
| 16<br>24 | 16<br>26 | 20<br>28 | 20<br>30 | 24<br>16 | 24<br>18 | 28<br>20 | 28<br>22 |
| 2<br>6 | 2<br>8 | 6<br>10 | 6<br>12 | 10<br>14 | 10<br>0 | 14<br>2 | 14<br>4 |
| 2<br>10 | 2<br>12 | 6<br>14 | 6<br>0 | 10<br>2 | 10<br>4 | 14<br>6 | 14<br>8 |
| 18<br>22 | 18<br>24 | 22<br>26 | 22<br>28 | 26<br>30 | 26<br>16 | 30<br>18 | 30<br>20 |
| 18<br>26 | 18<br>28 | 22<br>30 | 22<br>16 | 26<br>18 | 26<br>20 | 30<br>22 | 30<br>24 |
| 9<br>13 | 9<br>15 | 13<br>1 | 13<br>3 | 1<br>5 | 1<br>7 | 5<br>9 | 5<br>11 |
| 9<br>1 | 9<br>3 | 13<br>5 | 13<br>7 | 1<br>9 | 1<br>11 | 5<br>13 | 5<br>15 |
| 25<br>29 | 25<br>31 | 29<br>17 | 29<br>19 | 17<br>21 | 17<br>23 | 21<br>25 | 21<br>27 |
| 25<br>17 | 25<br>19 | 29<br>21 | 29<br>23 | 17<br>25 | 17<br>27 | 21<br>29 | 21<br>31 |
| 11<br>15 | 11<br>1 | 15<br>3 | 15<br>5 | 3<br>7 | 3<br>9 | 7<br>11 | 7<br>13 |
| 11<br>3 | 11<br>5 | 15<br>7 | 15<br>9 | 3<br>11 | 3<br>13 | 7<br>15 | 7<br>1 |
| 27<br>31 | 27<br>17 | 31<br>19 | 31<br>21 | 19<br>23 | 19<br>25 | 23<br>27 | 23<br>29 |
| 27<br>19 | 27<br>21 | 31<br>23 | 31<br>25 | 19<br>27 | 19<br>29 | 23<br>31 | 23<br>17 |

Figure 20A

| | | | | | | | |
|---|---|---|---|---|---|---|---|
| 0<br>6 | 0<br>8 | 4<br>10 | 4<br>12 | 8<br>14 | 8<br>0 | 12<br>2 | 12<br>4 |
| 0<br>10 | 0<br>12 | 4<br>14 | 4<br>0 | 8<br>2 | 8<br>4 | 12<br>6 | 12<br>8 |
| 2<br>8 | 2<br>10 | 6<br>12 | 6<br>14 | 10<br>0 | 10<br>2 | 14<br>4 | 14<br>6 |
| 2<br>12 | 2<br>14 | 6<br>0 | 6<br>2 | 10<br>4 | 10<br>6 | 14<br>8 | 14<br>10 |
| 9<br>15 | 9<br>1 | 13<br>3 | 13<br>5 | 1<br>7 | 1<br>9 | 5<br>11 | 5<br>13 |
| 9<br>3 | 9<br>5 | 13<br>7 | 13<br>9 | 1<br>11 | 1<br>13 | 5<br>15 | 5<br>1 |
| 11<br>1 | 11<br>3 | 15<br>5 | 15<br>7 | 3<br>9 | 3<br>11 | 7<br>13 | 7<br>15 |
| 11<br>5 | 11<br>7 | 15<br>9 | 15<br>11 | 3<br>13 | 3<br>15 | 7<br>1 | 7<br>3 |

Figure 20B

| | | | |
|---|---|---|---|
| 0<br>1 | 0<br>3 | 2<br>1 | 2<br>3 |
| 0<br>3 | 0<br>1 | 2<br>3 | 2<br>1 |
| 3<br>0 | 3<br>2 | 1<br>0 | 1<br>2 |
| 3<br>2 | 3<br>0 | 1<br>2 | 1<br>0 |

Figure 20C

EFFICIENT HARDWARE A-BUFFER USING THREE-DIMENSIONAL ALLOCATION OF FRAGMENT MEMORY

FIELD OF THE INVENTION

This invention relates generally to graphics accelerators, and more particularly to graphics accelerators that store multiple fragments from multiple 3D surfaces for each pixel, in order to display antialiased and transparent surfaces that are presented to the graphics accelerator in an arbitrary order.

BACKGROUND OF THE INVENTION

Fragments and A-Buffers

A three-dimensional (3D) graphic processing device uses a description of an object such as a polygon, line, or triangle to generate the object's constituent fragments. A fragment is defined as all information required to render a single pixel that is within the boundaries of the object, for example, the x and y coordinates of the pixel, the red, green, and blue color values used to modify the pixel, alpha transparency and Z depth values, texture coordinates, and the like. Portions of a fragment are modified, transformed, or deleted at various points in the graphics pipeline.

The graphics device may generate fragments for a single pixel from several different objects. An aliased graphics device samples each object at a single location at each pixel, for example, the center of each pixel. If the sample point is inside the object, the graphics device generates a fragment. If all fragments generated for a pixel from different objects are opaque, then the color displayed at that pixel is completely determined by the fragment nearest to the viewer that contains the pixel's sample point; all other fragments from other surfaces have no effect upon the pixel's color. Some objects may be partially transparent (i.e., having an alpha transparency value less than 1.0). Objects behind the partially transparent object are visible, albeit filtered and attenuated. Partially transparent objects must be presented to the graphics accelerator after all opaque objects in a scene, and must further be sorted so that partially transparent fragments are presented to a pixel in order from farthest to nearest the viewer. Each partially transparent fragment is blended with the existing pixel color. Such a system exhibits aliasing artifacts (staircased or jagged object edges) and requires the sorting of partially transparent objects by Z depth order.

High-quality graphics hardware provides support for antialiasing. Rather than storing a single color and alpha transparency value at a pixel, these devices sample each pixel at multiple locations, and store a fragment for each sample location. This technique reduces aliasing artifacts. But it still requires partially transparent objects to be sorted in depth order, and also increases memory bandwidth requirements in direct proportion to the number of sample points per pixel.

Even higher-quality graphics hardware provides support for antialiasing and order-independent partially transparent objects. These devices use techniques derived from Loren Carpenter, described in "The A-buffer, an Antialiased Hidden Surface Method," ACM Computer Graphics, Volume 18, Number 3, July 1984 (SIGGRAPH 1984 issue), which is hereby incorporated by reference as background information. Rather than maintaining a single fragment for each sample point associated with a pixel, the A-buffer maintains multiple fragments for each pixel, ideally one fragment for each object in a scene presented thus far that is still visible at one or more sample points associated with the pixel. In addition to the aforementioned color, transparency, and Z depth information, a fragment also includes a representation of the portion of the fragment that is visible, e.g., a bit mask that represents one of a plurality of sample points associated with the pixel contained within the object. It may also include other information such as Z gradient values that indicate how quickly the Z depth value is changing in the x and y directions so that Z depth values can be reconstructed more accurately at each sample point.

FIG. 1 shows a pixel 100 that has 8 sample points S0-S7. An opaque fragment 110 contains sample points S0, S1, and S2, and is closest to the viewer with a Z depth of 14. Because it is closest to the viewer, all portions of fragment 110 are visible. Visible portions of fragments are shown with solid lines; obscured portions with dashed lines. A partially transparent fragment 120 contains sample points S1, S3, and S6, and is farther from the viewer with a Z depth of 92. Note that though the partially transparent fragment 120 contains sample point S1, the fragment is not visible at this sample point, as it is obscured by opaque fragment 110. An opaque fragment 130 contains sample points S1, S3, S5, S6, and S7, and is farthest from the viewer with a Z depth of 108. Fragment 130 is not visible at sample point S1, as it is obscured by opaque fragment 110. The partially transparent fragment 120 is in front of fragment 130 at sample points S3 and S6, but its translucency allows fragment 130 to be seen at those points. The color of partially transparent fragment 120 modifies the color of fragment 130 at sample points S3 and S6. For example, if partially transparent fragment 120 is greenish, it will give a green tinge to the portions of fragment 130 visible through it.

In FIG. 1, each fragment is shown directly facing the viewer, and thus has the same Z depth value at all points on the fragment. In reality, fragments can angle obliquely to the viewer, and the Z depth can change across fragments. A fragment may even physically intersect another fragment, so that it is behind the second fragment at some sample points, yet in front of the same fragment at other points. Some prior art A-buffer implementations contain gradient information so that Z depth values can be accurately recreated at each sample point.

FIG. 2 shows some of the information that might be stored in an A-buffer for each of the fragments 110, 120, 130 of FIG. 1. Line 210 shows the information stored for fragment 110. This is a bright red opaque fragment: its red value is the maximum value of 1.0, green and blue are the minimum value of 0.0, and the alpha transparency value is the maximum 1.0, meaning that it is completely opaque. It has a Z depth of 14. The sample mask indicates which of the eight sample points are contained by the fragment and are also visible. The three right-most bits of the mask, representing sample points S0, S1, and S2, are 1, while the five left-most bits of the mask, representing sample points S3-S7, are 0.

Line 220 shows the information stored for fragment 120. This is a green-blue partially transparent fragment. Its color values (red 0.0, green 1.0, blue 1.0) indicate that it passes only green and blue light, and its alpha value of 0.5 indicates that it attenuates the light passing through it by 50%. Its Z depth is 92. Its sample mask indicates that S3 and S6 are visible; S1 is obscured by fragment 110.

Line 230 shows the information stored for fragment 130. This is a yellow opaque fragment: its red value is 1.0, green 1.0, blue 0.0, and alpha 1.0. Its Z depth is 108. Its sample mask indicates that S3, S5, S6, and S7 are visible. S1 is obscured by fragment 110. S3 and S6 are behind partially transparent fragment 120 but are nonetheless visible through it.

One possible hardware implementation of an A-buffer is described in U.S. patent application Ser. No. 09/301,257 for METHOD AND APPARATUS FOR COMPOSITING COLORS OF IMAGES USING PIXEL FRAGMENTS WITH Z AND Z GRADIENT PARAMETERS, and described more comprehensibly by Norman P. Jouppi and Chun-Fa Chang in "$Z^3$: An Economical Hardware Technique for High-Quality Antialiasing and Transparency" in Proceedings of the 1999 EUROGRAPHICS/SIGGRAPH Workshop on Graphics Hardware, ACM Press, New York, August 1999, pp. 85-91, both incorporated herein by reference as background information.

In the Jouppi invention, a predetermined number of fragments are statically allocated to each pixel. If more fragments are visible at a pixel than are allocated, that invention merges two fragments, or discards a fragment, at some loss of visual fidelity. To determine the resulting color at a pixel, all fragments still available are processed using a filter function to weight their contributions appropriately.

Different 3D scenes being rendered require widely different amounts of storage per pixel, depending on the parts of the scene being displayed at a particular pixel. For example, if a pixel is fully covered by the object closest to the viewer, and that object is opaque, only storage for one fragment is required at the pixel. However, if a building is rendered with partially transparent walls, floors, etc. using many small triangle objects, more than two dozen fragments may be required for fully accurate rendering of some pixels.

If a small number of fragments are allocated to each pixel, then pixels that require a large number of fragments may display a color substantially different from the desired color. On the other hand, if a large number of fragments are allocated to each pixel, much of the graphics memory will go unused; and, if the fragments are stored in some form of Dynamic Random Access Memory (DRAM), then typical prior art arrangements of pixels will waste graphics memory bandwidth.

Characteristics of Dynamic Random Access Memory (DRAM)

DRAMs are internally partitioned into rows (pages). DRAM pages cannot be directly read or written. Instead, the pages are statically partitioned into one or more banks, so that each page is associated with exactly one bank. A page must be loaded into a sense amplifier (also called a bank, as historically each bank was associated with exactly one sense amplifier) before data in it is read or written.

DRAMs split the address to be read or written into two parts, supplied over the same pins in different cycles. The first part of the address selects a row (page) of the memory and a bank (sense amp) into which to load a page. Supplying a row address ("row activating" or "opening" a page) destructively reads the page from the memory array into the corresponding sense amplifier. The second part of the address selects a column (word) within the row, and a bank from which to load the word. Additional locations in the same page may be accessed quickly by sending just a new column and bank address, and the data is read from or written to the appropriate sense amplifier. In effect, each bank's sense amplifier acts as a cache line in a direct-mapped cache for the DRAM pages.

To access a page that is not already loaded into its corresponding sense amp, the data in the sense amp must be written back to the page in the memory array from which it was loaded (the page is "precharged" or "closed"). Since the read that loads a page into a sense amp is destructive, this write back is required even if the data in the sense amp is never written. Then the new page must be loaded into the sense amp. The precharge and row activate operations typically take seven or eight times longer than accessing data already loaded into the bank. The combination of precharge and row activate operations is hereafter referred to as "page crossing overhead."

Modern DRAMs typically offer pages that are 1 kbyte or 2 kbyte in size, where a "byte" may be 8 bits or 9 bits.

Synchronous DRAM (SDRAM) or Double-Data Rate DRAM (DDR-RAM) typically offer four "independent" banks, in which each bank has its own sense amp, and so activity in one bank does not affect activity in another bank.

Most existing RAMBUS DRAMs (RDRAMs) offer sixteen or 32 "dependent" banks, in which each sense amp is split into two halves, and most of the sense amp halves are shared between two adjacent banks. FIG. 3 shows an example of a sixteen dependent bank RDRAM. Data for pages associated with bank 0 are stored in the Bank 0 partition 350. When access to a page in the Bank 0 partition 350 is desired, half the page is loaded into the Bank 0 sense amp 300, and the other half is loaded into the Bank 0/1 sense amp 301. When access to a page in the Bank 1 partition 351 is desired, half the page is loaded into the Bank 0/1 sense amp 301, and the other half is loaded into the Bank 1/2 sense amp 302.

This sharing places restrictions upon bank usage. In particular, pages from adjacent RAMBUS banks cannot be simultaneously open. Thus, if a page from the Bank 1 partition 351, for example, is open, half of its page data resides in Bank 0/1 sense amp 301, which is shared with the Bank 0 partition 350, and half of its page data resides in the Bank 1/2 sense amp 302, which is shared with the Bank 2 partition 352. A page in the Bank 0 partition 350, or in the Bank 2 partition 352, cannot be opened until the page from the Bank 1 partition 351 is written back, thus freeing up Bank 0/1 sense amp 301 and Bank 1/2 sense amp 302.

The 32 dependent bank RDRAM allows banks 15 and 16 to be simultaneously open since they do not share a bank 15/16 sense amp. Rather, the bank 15 partition is physically distant from bank 16, and so these chips have a bank 15 sense amp and a separate bank 16 sense amp. In terms of the average number of open pages, sixteen dependent banks are roughly equivalent to 7 independent banks; 32 dependent banks are roughly equivalent to 15 independent banks. Some newer RDRAM chips are abandoning the sixteeen or 32 dependent bank design in favor of four independent banks.

To alleviate page crossing overhead, modern DRAMs (e.g., SDRAM, DDR-RAM, RDRAM) allow precharge and row activate operations for one or more banks to occur simultaneously with data read or write operations of other banks. If precharge and row activate commands are issued sufficiently far in advance of access to the data on the page (the page is "prefetched"), then the page crossing overhead can be substantially reduced, or even completely hidden. The precharge and row activate activity takes place while useful data transfers occur to or from banks that are already open, and if enough such data transfers take place, then the precharge and row activate cycles can be completed before any transfers need take place from the new page.

If only a single precharge and row activate command can be outstanding, then the page previously accessed must have enough accesses to completely hide the prefetch overhead. Many DRAM parts today allow multiple prefetch operations. For example, if a DRAM allows two outstanding prefetch operations, then the two pages previously accessed (assuming they are in non-conflicting banks) must have enough accesses to hide the prefetch operations. Thus, if the appropriate banking assignments can be made, multiple outstanding precharge and row activate operations require a given page to have fewer accesses to effectively hide the page crossing overhead.

Most high-quality graphics devices require more memory than is available in a single DRAM, and so require several such DRAM chips. The simplest arrangement of multiple DRAM chips ties all their address and data lines together, and use enable lines to select which chip should store data from or source data to the common data lines. However, this means that only one memory chip can be accessed at a time, resulting in much smaller memory bandwidth than the sum of the individual chips' bandwidths. This maximum peak bandwidth available can be achieved by sharing the same set of address lines to all memory chips, but using different pins for the data lines of each chip. This allows a much wider word to be read or written in a cycle. However, useful memory bandwidth doesn't increase in proportion, because such a wide word rarely contains useful information across all its bits. To maximize useful memory bandwidth, high-performance graphics accelerators typically use multiple memory controllers, each with their own address and data lines. With multiple memory controllers, the peak achievable bandwidth increases in proportion to the number of memory controllers, as the word width per controller is much smaller, and so it is more likely that useful information is contained in all bits of each word. In the limit, each memory controller is attached to one or a few DRAM chips, and none of the DRAM data lines is shared with other DRAMs. In the future, with large embedded DRAMs, pin count will not be an issue since the controllers and DRAM memory can be on the same chip.

Pixel Access Patterns and Graphics Memory Organization

Once data for a given pixel has been accessed in a graphics memory, nearby pixels on the display are more likely to be accessed than pixels that are farther away. In order to exploit DRAM banks, and to increase page prefetching, the screen is partitioned into two-dimensional rectangles, all the same height and width. The information associated with a rectangle's pixels is stored in one DRAM page in one of the memory controllers, or in a small number of pages, one page per memory controller. Advantageously, the rectangles are squares, or have at worst a width to height aspect ratio of 2 to 1 (or 1 to 2). Some graphics devices generate all fragments of an object that are within one rectangle before moving to another rectangle, as described in United States patent application bearing attorney docket number 9772-0019-999, entitled "METHOD AND APPARATUS FOR TILED POLYGON TRAVERSAL," filed Aug. 20, 2001, which is hereby incorporated by reference in its entirety. Other devices may sort fragments after they are generated to achieve the same effect across multiple objects. These techniques increase the number of memory accesses to one page before accesses to another page, thus decreasing the number of page crossings required to paint an image in the graphics memory.

Partitioning the screen into rectangles associated with a page or group of pages reduces the number of page crossings, but still leaves page crossings that may conflict. A conflicting page crossing occurs when data is accessed in a new page too soon after data is accessed in the page that is already open in the same bank (or in an adjacent dependent bank). That is, access to the new page's data is desired before the precharge and row activate operations complete, and the access to the new page must be stalled.

In order to decrease the overhead associated with page crossing, the graphics devices can interleave (or "checkerboard") rectangles, so that at least the pixel data in horizontally and vertically adjacent rectangles resides in different banks. If enough banks are available, pixel data in diagonally adjacent rectangles may also reside in yet different banks. Such an arrangement reduces stall cycles in any fragment generator. Stalls can be further reduced with a fragment generator that appropriately generates or sorts fragments in an order that exploits the bank interleaving pattern.

FIG. 4 shows a "checkerboarded" arrangement of pages using two independent banks. Thin lines 401 demarcate pixel boundaries, while the thick lines 402 demarcate page boundaries. Each rectangle is eight pixels high by eight pixels wide. Each rectangle's pixel data may be stored in a single page of memory, or more commonly may be stored in several pages of memory, one page per memory controller. Further, the shaded pages 403 belong to one bank, while the unshaded pages 404 belong to another bank. Such an interleaving scheme, especially if fragments are generated or sorted appropriately, substantially increases the chances that a new page in a different bank can be prefetched completely while memory accesses are made to the other bank.

If multiple fragments are statically allocated to each pixel in a high-end graphics system, each pixel requires more storage space than if only a single fragment were stored. This problem is further exacerbated by the additional fragment data maintained in a multiple-fragment system (such as the sample mask, and possibly Z depth gradients) that are not maintained in a single fragment per pixel system. For example, the two fragment formats described later use 72 and 96 bits, which allows two fragments per 144-bit RDRAM word, or three fragments for every two words, respectively. If all fragments for a pixel are allocated to a single page, it is generally easiest if the number of words allocated for a pixel is a power of two. If a large number of fragments are stored per pixel, then using the typical arrangement of pixel data in graphics memory may result in partitioning the screen into very small rectangles. For example, if eight words are allocated per pixel, then a 64-word RDRAM page can hold fragment data for only eight pixels.

Partitioning the screen into many small rectangles would be fine if updating a pixel requires reading and writing many fragments. There would still be sufficient memory accesses on a page to allow prefetching of the next page. But in the usual case, only a few fragments per pixel are actually visible and stored. Most memory locations in each page are not accessed as a new object's fragments are stored into graphics memory. Thus, fewer accesses are, made to the data in each DRAM page than when a single fragment per pixel is stored, and page-crossing overhead may be substantially higher. Some other form of partitioning that supports efficient graphics memory accesses even when a large number of fragments are statically allocated to each pixel would be desirable.

Further, statically allocating a large number of fragments for each pixel wastes graphics memory. The average number of fragments required per pixel is usually many times smaller than the maximum number of fragments required by a few pixels. Some portions of scenes with many partially transparent surfaces can easily require 20 to 30 fragments per pixel. The original A-buffer proposal of Loren Carpenter, in fact, uses a dynamically allocated list of fragments for each pixel. However, this algorithm was proposed as a software algorithm, in which the time to process each fragment was large compared to the time to access each fragment in memory. High-quality graphics hardware, in which fragment processing time is minimal, will stall waiting for memory unless the fragments can be read and written quickly.

A linked list of fragments, such as might be used in software, makes poor use of memory bandwidth, especially DRAM bandwidth. Exploiting the DRAM's capabilities requires that several memory accesses are directed to the same page or group of pages that are loaded into an active subset of the DRAM sense amps, while new pages are fetched into other inactive sense amps, so that the overhead of precharging and loading these new pages can be overlapped with the accesses to active banks. A linked list allows the screen to be partitioned into fairly large rectangles: each pixel data contains the first fragment and a pointer to the next fragment. If each pixel requires only a single fragment, prefetching adjacent pages works well. But if even a few pixels in a rectangle require more than one fragment, memory efficiency plummets. Over time, any fragment past the first in a linked list tends to be stored at a random location in memory. Traversing such a randomized linked list usually accesses one fragment, or at most a few fragments, on a particular page. Worse, since the address of the next fragment is not known until the current fragment is fetched, it is impossible to overlap the overhead of fetching new pages into banks. This problem is made even worse by the latencies involved in sending a read address out to the DRAM, getting a result back, and processing the result to generate a new address from which to read.

FIG. 5 shows the memory locations that might get assigned to the five fragments of an exemplary pixel. Page boundaries are shown with thick lines, memory locations are shown with thin lines. Fragment 1 is stored in memory location 513. In addition to the fragment information previously described in relation to FIG. 2, each fragment also contains a "next" field, which either contains the memory location for the next fragment in the list, or contains a 0, indicating that it is the last fragment in the list. Fragment 1's next field contains the address 519. Fragment 2 is stored in memory location 519, and contains a next pointer to location 518, where fragment 3 is stored. Fragment 4 is stored in memory location 514, and fragment 5 in memory location 516. Fragment 5's next field contains a 0, indicating that there are no more fragments in the list. The five fragments are stored in four different pages. Since the next field is part of each fragment, the graphics device cannot issue precharge and row activate commands for the next fragment's page until the current fragment has been read. Since the read commands are themselves pipelined in the DRAM, and it takes time to send a read address from the graphics chip to the DRAM, and to move the data from the DRAM data lines into logic in the graphics chip that decides what to do next, fetching each fragment in a list could easily take two or three times the already large precharge and row activate time.

Alternatively, the data for each pixel might be made up of one or a few fragments, and a pointer to an array of fragments. Each such fragment array would probably be contained within a single page, or at worst span two pages, which would allow the fragments for a single pixel to be accessed efficiently. But again, over time, the fragment arrays for nearby pixels would tend to end up in random locations in memory, so that accessing fragments associated with nearby pixels would make poor use of DRAM capabilities. And in both cases, frequent allocation, reallocation, and deallocation of fragment arrays would add yet more overhead.

One prior art device uses a hybrid approach, in which a small number of fragments (e.g. three fragments) are stored in a small array, and each such array has a pointer to the next small array. Although page crossing overhead is amortized over a few fragments, memory performance is still quite poor. Following the links is inefficient, and over time fragment data for nearby pixels becomes non-localized. And allocation, reallocation, and deallocation of fragment data are time consuming.

Accordingly, there exists a need for a method and apparatus that can dynamically allocate different number of fragments to different pixels in a graphics memory and efficiently reclaim this storage for use by other pixels. Further, such a method and apparatus should allocate fragments to memory locations and maintain associated data structures such that (1) the allocation of new fragments has low overhead, (2) access to a pixel's list of fragments exploits the DRAM page cache (banks) and page prefetching capabilities, (3) access to nearby pixel's fragment lists also exploits DRAM capabilities, and (4) deallocation of fragments no longer needed has low overhead.

SUMMARY OF THE INVENTION

The present invention provides a method and apparatus that can dynamically allocate different number of fragments to each pixel in a graphics memory. Further, the present invention allocates fragments to memory locations and maintains associated data structures such that (1) the allocation of new fragments has low overhead, (2) access to a pixel's list of fragments exploits the DRAM page cache (banks) and page prefetching capabilities, (3) access to nearby pixel's fragment lists also exploits DRAM capabilities, and (4) deallocation of fragments no longer needed has low overhead.

In one embodiment, the number of fragments allocated per pixel may vary. Compared to statically allocating fragment data, the present invention allows a larger average number of fragments to be maintained per pixel for the same amount of memory, thus improving visual fidelity. The arrangement of fragments makes use of two properties of three-dimensional scene rendering, in order to exploit the aforementioned properties of modern DRAMs.

First, updating one pixel with a new fragment substantially increases the probability that nearby pixels will also be updated in the near future, either with fragments from the same object or with fragments from another object that is adjacent to or near the first object. This is especially true with a tiling or sorting fragment generator that explicitly generates fragments in an order that increases this two-dimensional locality, and does so in a way that reduces page crossings and further reduces conflicting page crossings.

To exploit this first property, as with prior art, an embodiment of the present invention partitions the screen into two-dimensional rectangles, each of which is assigned to a different memory controller. However, the invention does not statically allocate all fragments for a pixel to a single page or group of pages. Doing so will force the rectangle size to be too small if a large number of fragments are allocated. Rather, the present invention statically allocates a small number of fragments for example, between two and eight fragments, to each pixel. Pages allocated to the first few fragments of each pixel are called "base pages" or "top-level pages." This allocation of only a few fragments, and thus a few words, to each pixel allows the screen to be partitioned into large rectangles. If, as is often the case, only a few fragments need be maintained at each pixel, the dominant source of page crossings is to access nearby pixels in adjacent rectangles. This arrangement allows sufficient time to prefetch the appropriate pages for pixels in adjacent rectangles. If many banks are allowed, as with RDRAM's sixteeen or 32 dependent banks, the interleaving even allows for non-adjacent pages to be prefetched as well.

Second, the number of fragments maintained for a given pixel at a given time is roughly correlated with the number of fragments stored for nearby pixels. Pixels generally require more than one or two fragments for two reasons: several small or narrow objects are visible at the pixel because each contains only a portion of the pixel, or several partially transparent objects fully or partially contain the pixel. In the first case, it is likely that nearby pixels also contain fragments from many small or narrow objects. In the second case, it is likely that nearby pixels also contain roughly the same number of partially transparent surfaces (that is, nearby pixels have roughly the same depth complexity).

To exploit this second property, the invention partitions the screen into two-dimensional rectangles of "overflow panes." An overflow pane's pixel data is stored in one or more pages of graphics memory, and each overflow pane contains pixel data from at most one page per memory controller. An overflow pane contains additional fragments for a pixel, for which there was no room in a top-level page, or in previous overflow panes associated with the pixel. For example, if the top-level pages contain space for each pixel's first three fragments, then an overflow pane contains space for the next three (fourth, fifth, and sixth) fragments, or the next three after that (seventh, eighth, and ninth), etc.

Overflow panes may be the same size as the top-level rectangles storing the first few fragments allocated to each pixel. Or these overflow panes may be smaller, in order to avoid wasting memory by allocating additional fragment storage for pixels that do not need it. Overflow panes effectively add a third dimension of partitioning. Two dimensions are provided by partitioning the two-dimensional screen of pixels, so that different rectangles of pixels store their data in different groups of pages. The third dimension is provided by partitioning the list of fragments associated with each pixel, so that different groups of fragments (e.g. fragments 1-3, fragments 4-6, fragments 7-9) store their data in different groups of pages.

In the same way that prior art interleaves non-conflicting banks across the two-dimensional partitioning of the screen into rectangles, an embodiment of the invention also interleaves non-conflicting banks across this three dimensional partitioning. The large number of dependent banks offered by RDRAM is particularly useful. In such cases, the invention interleaves non-conflicting banks so that pixels that require enough fragments to use a single overflow pane often allow the top-level page, the overflow pane's page, an adjacent top-level page, and an adjacent overflow pane's page to be open simultaneously. In this domain, the interleaving strikes a balance between accesses to overflow panes, and access to nearby pixels in different rectangles.

An embodiment of the invention further interleaves non-conflicting banks so that pixels that require several overflow panes allow the top-level page, as well as the pages for several overflow panes for the pixel, to be open simultaneously. In this domain, the interleaving allows efficient access to several overflow panes for a subset of pixels that lie within a single top-level pane.

In this aspect of the invention, the interleaving promotes effective prefetching of fragment information, regardless of the number of fragments allocated to pixels.

In another aspect of the invention, an entire overflow pane is allocated or deallocated. Since pixels in a pane are likely to require roughly the same number of fragments, this amortizes allocation and deallocation overhead over many fragments.

In another aspect of the invention, an overflow pane is deallocated as soon as it is no longer required. This frees the pane for use by other pixels within the same scene, and so further reduces the memory required to render complex scenes.

An embodiment of the invention maintains two types of data about pixels. The first type is fragment data that includes subsets of a pixel's actual fragments. The second type is bookkeeping data that includes any other information about a pixel, for example, how many fragments are being used by a pixel, and how to find a pixel's fragment data in memory. In another aspect of the invention, bookkeeping information about the number of fragments allocated to each pixel, and the location of the overflow panes assigned to a group of pixels, is maintained in data structures located elsewhere in graphics memory from the fragment data itself. A small amount of this bookkeeping data is cached inside the graphics device. This bookkeeping information requires a fraction of the amount of memory as the fragment data, so that even a small amount of cache maintains the information needed to access fragments for a large number of pixels. Again, this bookkeeping information promotes effective prefetching, as the graphics device needs not process a portion of a pixel's fragment data in order to find out where the rest of the data should be fetched from, but can use the bookkeeping information to prefetch a new page well in advance of accessing fragment data on the new page.

BRIEF DESCRIPTION OF THE DRAWINGS

Embodiments of the invention will be described with reference to the accompanying drawings, in which:

FIGS. 8A-8E are diagrams of the interleaving of memory controllers among pixel data;

FIG. 9 is a diagram of the overall layout of various data structures pertaining to fragments that are stored in graphics memory;

FIG. 10 is a diagram of the layout of various data structures associated with a drawing buffer;

FIG. 11 is a diagram of the count and clip data structure associated with a drawing buffer;

FIGS. 12A and 12B are diagrams of fragment formats in graphics memory;

FIGS. 15A, 15B, and 15C are diagrams of bank interleaving when overflow panes occupy at least a page;

FIGS. 17A and 17B are diagrams of conflicts between banks under fine-grain interleaving;

FIGS. 18A, 18B, and 18C are diagrams of conflicts between banks under large-grain interleaving where four or sixteen banks are grouped together within a pixel interleaving block;

FIGS. 19A, 19B, and 19C are diagrams of bank interleaving when two overflow panes occupy a page;

FIGS. 20A, 20B, and 20C are diagrams of bank interleaving when four overflow panes occupy a page.

DESCRIPTION OF PREFERRED EMBODIMENTS

System Overview

Figures 1, 2:
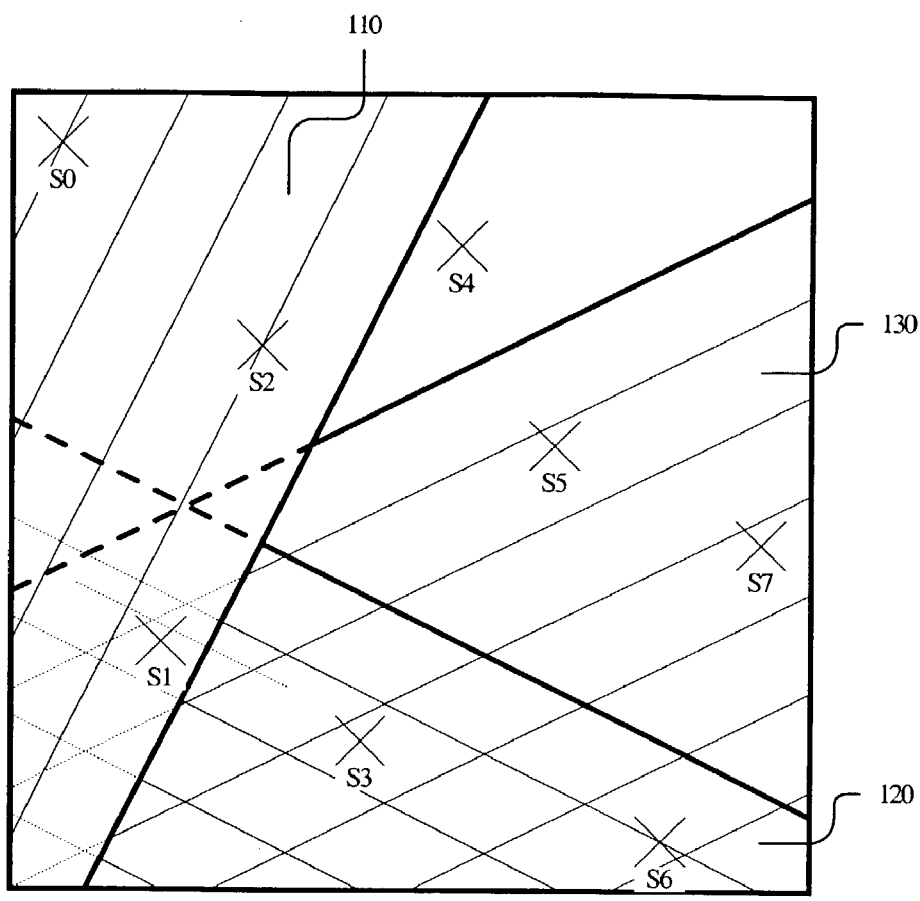
FIG. 1 is a diagram of a pixel with three visible fragments.
FIG. 2 is a diagram of the fragment data that is stored for the pixel in FIG. 1.
Figure 3:
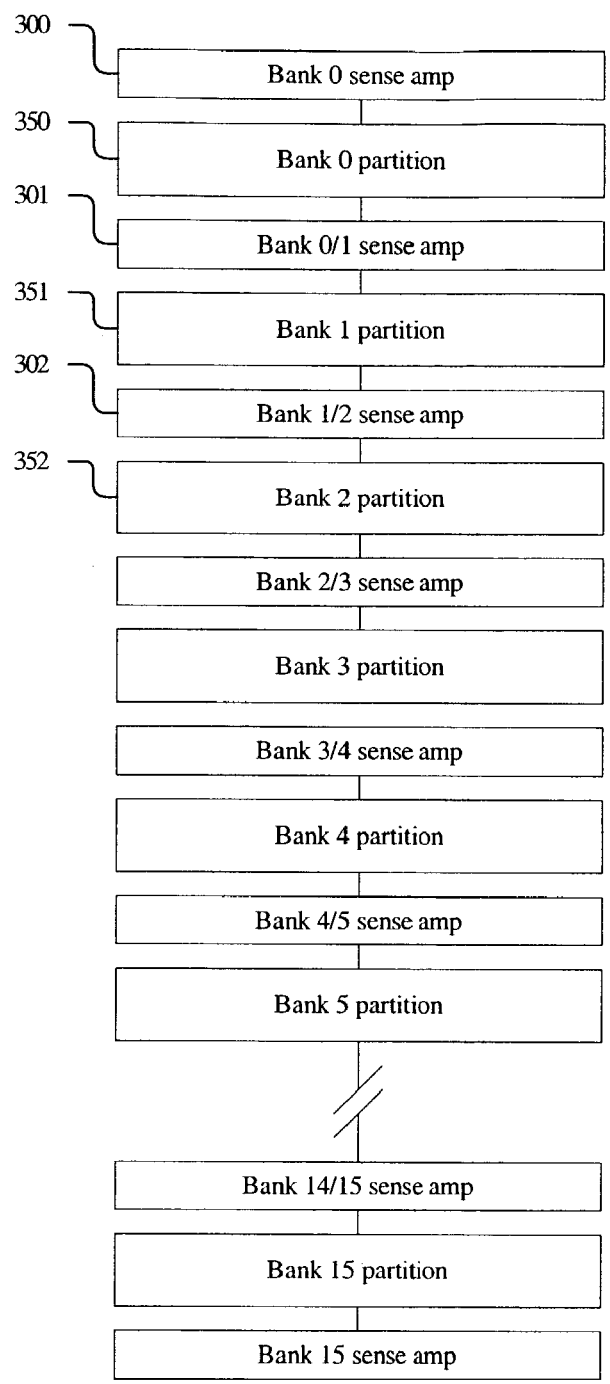
FIG. 3 is a diagram showing how sense amplifiers are shared between sixteen dependent banks in a RAMBUS RDRAM memory chip.
Figure 4:
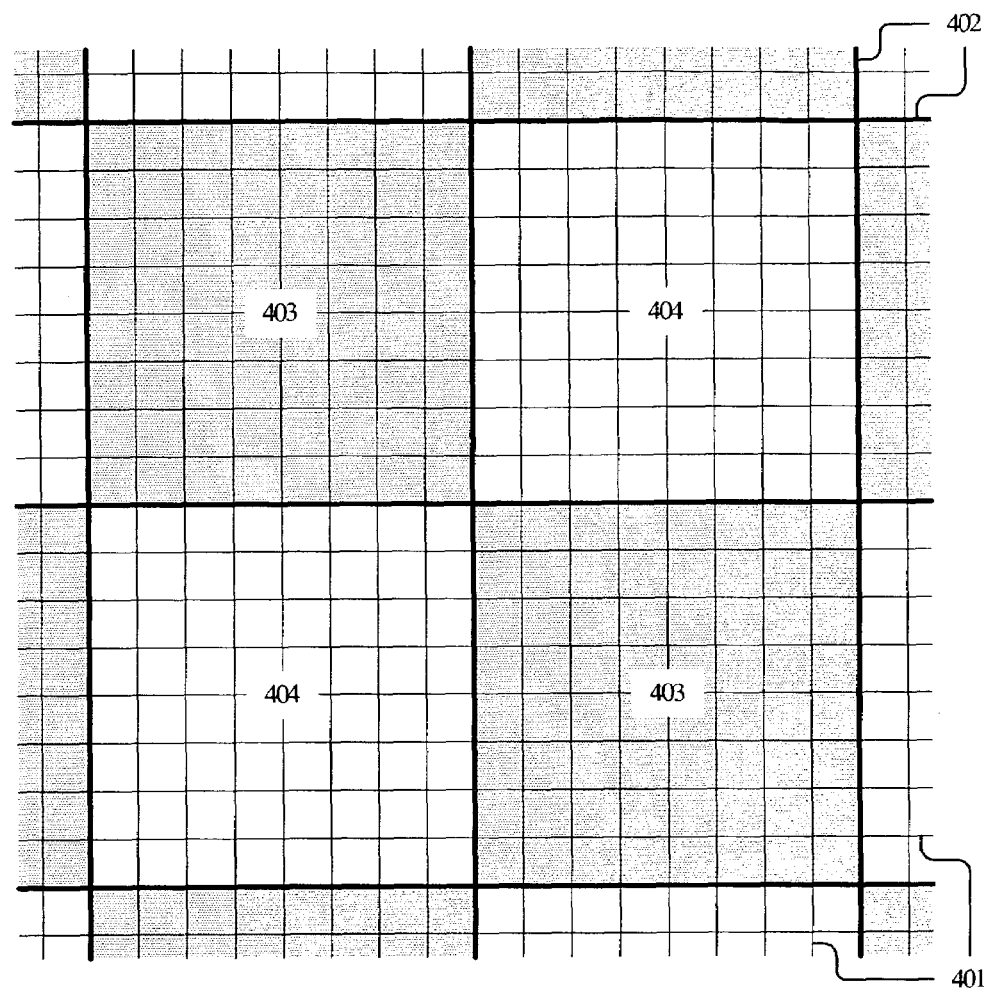
FIG. 4 is a diagram of memory pages assigned to banks in a checkerboard pattern.
Figure 5:
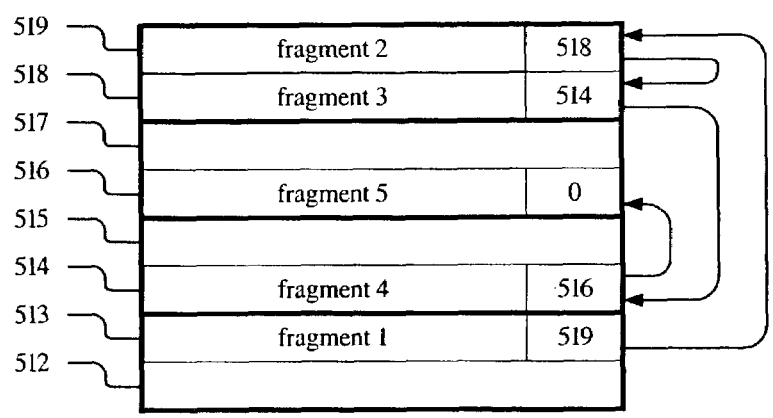
FIG. 5 is a diagram of fragments arranged in graphics memory as a linked list.
Figure 6:
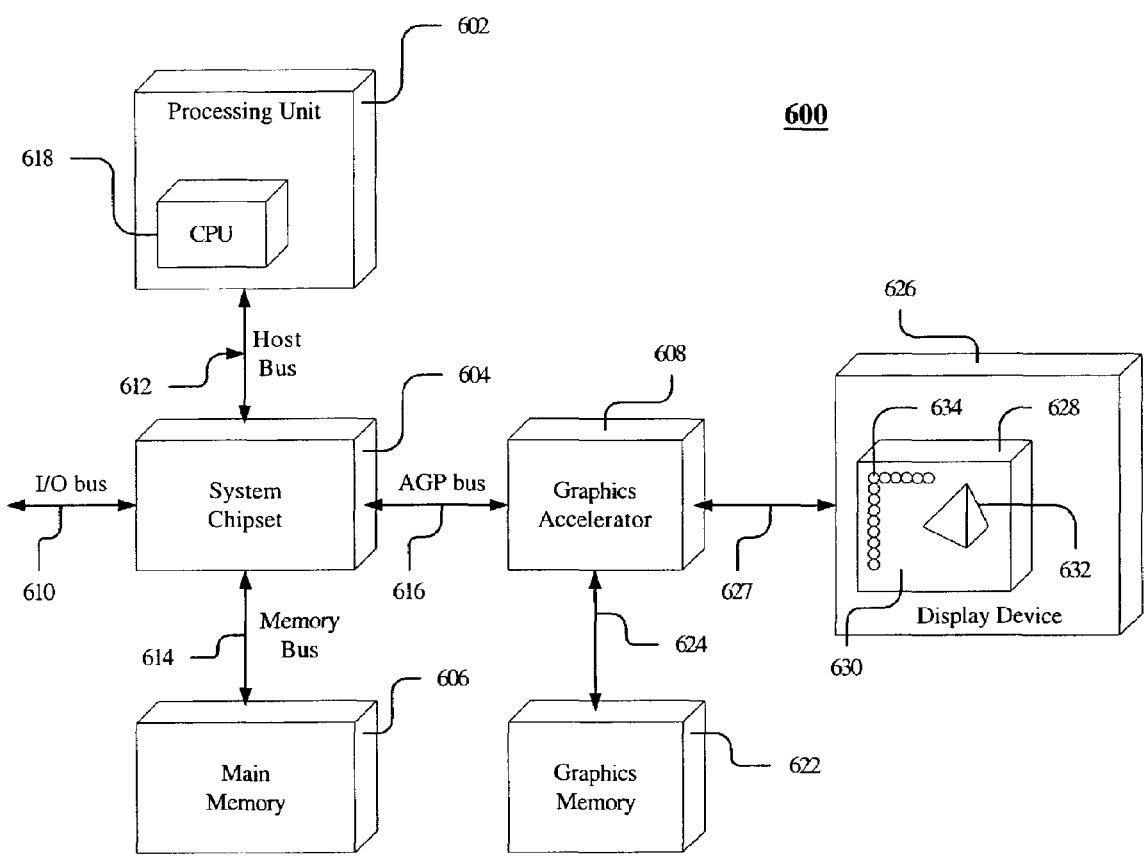
FIG. 6 is block diagram of a graphics processing system that can use the efficient memory organizations according to the invention.

FIG. 6 shows a computer system 600 embodying the principles of the invention. The system 600 can generate monochrome or multicolor 2-D and 3-D graphic images for rendering on a display device. In the computer system 600, a system chip set 604 provides an interface among a processing unit 602, a main memory 606, a graphics accelerator 608, and devices (not shown) on an I/O bus 610. The processing unit 602 is coupled to the system chip set 604 by the host bus 612 and includes a central processing unit (CPU) 618. The main memory 606 interfaces to the system chip set 604 by memory bus 614.

The graphics accelerator 608 is coupled to the system chip set 604 by an AGP bus 616, to a graphics memory 622 by a bus 624, and to a display device 626 by a bus 627. The display device 626 includes a raster display monitor 628 for rendering color images on, for example, a display surface or screen 630. The invention can also be practiced with a monochrome monitor that displays gray-scale images, with a printer that prints black and white or color images, or with any other pixel-based output device such as a liquid-crystal or dot matrix displays.

The rendering surface 630 (e.g., a display screen), includes a 2-D array of data elements called pixels and produces an image 632 by illuminating a particular pattern of those pixels 634. Conventionally, the pixels have (x, y) Cartesian coordinates. The image 632, for example, can be 2-D alphanumeric characters or a 3-D scene filled with objects.

The graphics memory 622 includes storage elements for storing an encoded version of the graphical image 632. There is a direct correspondence between the storage elements and the pixels 634 on the display screen 630. The values stored in the storage elements for a particular pixel, referred to as pixel data, control the color and intensity of the particular pixel 634 on the screen 630.

General Operation

During operation, the processing unit 602 can issue graphics commands requesting that a complex graphical object be rendered into an image 632. The processing unit first tessellates the graphical object into primitive objects such as triangles, lines, or quadrilaterals, or into lists of such primitives. Each primitive object directly or indirectly specifies a convex polygon of three or more sides. The chip set 604 sends graphics commands specifying such primitives to the graphics accelerator 608, which executes the commands, converting the primitive objects into fragments.

A fragment is the information associated with a 2-D polygon created by clipping a convex polygonal primitive of the image 632 to the boundaries of a pixel. Fragment information initially includes the x and y coordinates of the pixel; in this description, x coordinates increase from left to right, and y coordinates increase from top to bottom. Fragments also include channel information that is interpolated from values provided at the primitive's vertices, such as the red, green, and blue color values of the primitive object at that location, alpha transparency, Z depth value, texture coordinates, and the like.

The information associated with a fragment is modified, replaced, transformed, or deleted in various pipeline stages of graphics accelerator 608. For example, texture coordinates may be mapped into texture color and transparency values, which are then further merged with the color and transparency values that were interpolated.

The graphics accelerator 608 adds to, merges, or replaces existing pixel data with data from the fragments, and loads the updated pixel data into the appropriate storage elements of the graphics memory 622. The graphics accelerator 608 also composites the new set of fragments for an updated pixel into a single color value, which is also loaded into graphics memory 622, where it can be read for screen refresh operations of display device 626.

Graphics accelerator 608 may be implemented as a single chip or as multiple chips. Similarly, graphics memory 622 may be implemented as a single general-purpose memory partitioned among a plurality of identical memory controllers in graphics accelerator 608, or may be implemented as several specialized memories, for example, a texture memory, a fragment memory, and a composited pixel color memory.

Graphics Accelerator Logic

Figure 7:
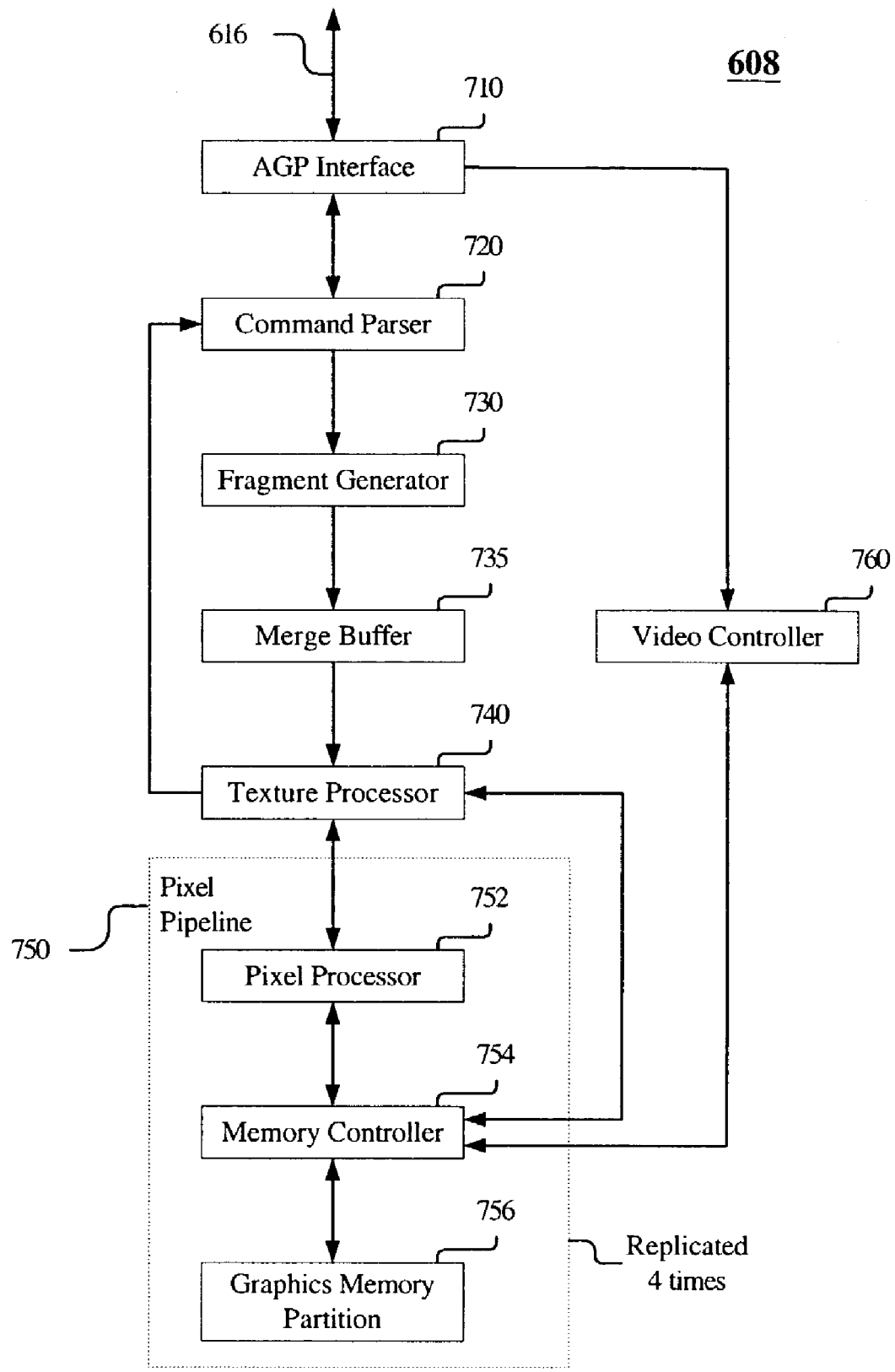
FIG. 7 is a block diagram of the graphics accelerator and memory of FIG. 6.

FIG. 7 depicts a simplified representation of the graphics accelerator 608 (FIG. 6). An interface 710, such as an AGP interface, couples the graphics accelerator to the system chipset 604 (FIG. 6) via AGP bus 616. Graphics rendering and other commands received from the processing unit 602 (FIG. 6) via the system chipset are parsed by a command parser 720. The parser 720 determines the object rendering operations to be performed, and passes these to a fragment generator 730. The fragment generator 730 generates one fragment for each pixel contained within the object, and sends these fragments to a fragment merge buffer 735. Merge buffer 735 merges multiple adjoining fragments from different objects of the same 3D surface into fewer fragments. Such merging reduces the number of fragments passed further in the pipeline, and in particular reduces the average number of fragments stored per pixel. The merge buffer 735 sends fragments to a texture processor 740 that applies a specified texture pattern, if any, to the object being rendered.

The resulting fragments are then passed to one or more of the four pixel pipelines 750 for pixel processing and storage. A pixel pipeline 750 preferably includes a pixel processor 752 for storing fragments into the graphics memory partition 756 via a memory controller 754. The pixel processor 752 may perform tasks such as adding a fragment obtained from the graphics accelerator 608 to a plurality of fragments previously stored in a graphics memory partition 756 and then storing the resulting combined fragments back into graphics memory partition 756. In one embodiment, graphics memory 622 (FIG. 6) has four graphics memory partitions 756.

The invention may use any type of modern DRAM for graphics memory 622. RAMBUS RDRAM memory parts, in which the word size is 144 bits, and pages are partitioned into sixteen or 32 dependent banks, will yield the best performance. Unless otherwise noted, the invention is described for use with such RDRAM, where each page is composed of 64 words. Some RDRAM parts support a page size of 128 words, which would further improve effective memory bandwidth by reducing the number of page crossings. The invention may be practiced with other memory technologies, such as SDRAM or DDRRAM. Such practice might require shrinking the size of various data if, for example 16-bit rather than 18-bit wide DRAM parts are used. Also, in such alternate memory technologies, the minimum word size that can be read or written is smaller than 144 bits, and so some data formats would change to exploit this smaller access quantum. Such modifications should be apparent to those ordinarily skilled in the art and having the benefit of this disclosure.

A video controller 760 couples all of the memory controllers 754 to a display device 626 (FIG. 6). The video controller 760 reads composite pixel values from the graphics memory partitions 756 via memory controllers 754 and sends corresponding pixel information to the display device 626 for display.

Memory Controller Interleaving Pattern

The graphics accelerator 608 has several memory controllers 754. The graphics memory 622 is statically partitioned equally among the memory controllers 754. This allows the memory controllers 754 to work independently rather than in lockstep, thus more fully making use of available graphics memory 622 bandwidth.

The pixel pipelines 750a-750d each receive fragments only for pixels that are stored in its graphics memory partition 756. If pixel processing work is not evenly distributed among the pixel pipelines 750a-750d, then some memory controllers 754 may sit idle while others labor, thus reducing effective memory bandwidth. In order to load balance the memory controllers 754, the pixels of the two-dimensional display device 626 are interleaved among the pixel pipelines 750a-750d and thus among the memory controllers 754.

The pixel pipeline 750 is implemented to process new and existing fragment data so quickly that performance is dependent mainly upon the effective bandwidth extracted from a graphics memory partition 756 via its memory controller 754. Over even short time periods, variations in the memory bandwidth required by updates (for example, caused by variations in the number of existing fragments at different pixels) average out, so that distributing fragment update work to a pixel pipeline 750 is mostly synonymous with distributing work to its memory controller 754. Similarly, assigning a pixel to a graphics memory partition 756 assigns responsibility for memory accesses to the pixel's data to the corresponding memory controller 754. The following descriptions thus take a memory controller centric view.

FIG. 8A shows a good interleaving pattern. Each small square represents a pixel interleaving block. In one embodiment, a pixel interleaving block contains data for a single pixel. In another embodiment, the pixel interleaving block contains data for a larger group of pixels, for example, a 4×4 square of pixels. Each pixel interleaving block is assigned to one of the graphics memory partitions 756, and thus to one of the memory controllers 754.

Each pixel interleaving block is labeled "A" through "D" to indicate which memory controller 754 it is assigned to. The larger thick line rectangles enclose the basic interleaving pattern that is repeated horizontally and vertically to fill the display. The basic pattern is shown inside the thick solid line rectangle 802 in the upper left corner; the other three identical dashed rectangles 804, 806, 808 contain the same pattern to illustrate how most objects will distribute fragment updates evenly over all of the pixel pipelines 750a-750d. In particular, even very thin horizontal, vertical, and diagonal objects distribute work evenly. This pattern, however, is not perfect. Objects with a slope of ±2 tend to distribute more work to two of the memory controllers 754, and less work to the other two; some objects with slope ±½ tend to distribute more work to one memory controller 754, and very little to another. In general, larger, more complex interleaving patterns distribute work more evenly, but require more complex mappings of pixel addresses to memory controllers 754.

The upper left pixel of a buffer (e.g., screen buffer or off-screen buffer) has the two-dimensional address (0, 0). If (x, y) represents the two-dimensional address of a pixel, then $(x_{pib}, y_{pib})$ represent the two-dimensional address of a pixel interleaving block, where:

$x_{pib} = x/\text{pixel\_interleaving\_block\_width}$ and $y_{pib} = y/\text{pixel\_interleaving\_block\_height}$.

The memory controller to which a pixel interleaving block $(x_{pib}, y_{pib})$ is assigned can be computed as:

$\text{controller} = (x_{pib} + 2*y_{pib}[0] + y_{pib}[2])[1:0]$ where an index [n] represents bit n of a multibit value, and a part selection [m:n] represents bits m down to n, inclusive. The least significant bit of a value is bit 0. For example, if $x_{pib}=3=11_2$, and $y_{pib}=5=101_2$, where the subscript "2" indicates a binary (base 2) representation, we have:

$\text{controller} = (11_2 + 2*1 + 1)[1:0] = (110_2)[1:0] = 10_2 = 2$

In the present discussion, the memory controller "0" is labeled "A", the memory controller "1" is labeled "B", etc. There are several different types of data associated with a pixel or group of pixels. The invention overlays the same interleaving scheme upon all data associated with a pixel, no matter how the data is otherwise arranged in graphics memory.

Advantageously, when a single memory controller 754 accesses a pixel's fragments and any information needed to determine where those fragments are stored, it can often schedule accesses to such bookkeeping information sufficiently far in advance of the accesses to the fragments. Similarly, in embodiments in which overflow panes can be allocated dynamically, allocation and deallocation for a pixel or group of pixels involve only one memory controller.

Interleaving Granularity

Choosing an appropriate pixel interleaving block size is a balancing act.

Smaller pixel interleaving blocks require little fragment buffering to even out short-term load imbalances among memory controllers. This advantage is non-existent below a certain block size, as enough fragment buffering is required to effectively schedule memory accesses to fragment bookkeeping information well in advance of access to the fragments themselves. Smaller blocks also greatly increase the probability that the next page required to access fragment data will be in a small set of "neighboring" pages. This property substantially improves the efficacy of the bank interleaving patterns described later, when using RDRAM parts with sixteen dependent or four independent banks. Finally, very fine grain interleaving (where a block is a single pixel) simplifies the buffering involved in distributing one cycle's worth of fragment generation to the various pixel pipelines.

Larger pixel interleaving blocks more effectively concentrate fragment bookkeeping information for adjacent pixels into fewer words, allowing smaller caches for, and fewer accesses to, bookkeeping information. Similarly, larger blocks concentrate more accesses to fragment data on a given page, and so result in fewer page crossings. Larger blocks also make more effective use of overflow panes, which are dynamically allocated when a pixel needs more fragment storage. The larger blocks result in fewer allocations and deallocations, and less wasted space that is allocated but not used. However, as described later, larger blocks also vastly increase the set of probable neighboring blocks within a memory controller, which in turn decreases the potential for prefetching. In systems with four independent or sixteen dependent banks, this disadvantage may outweigh all the other advantages of larger pixel interleaving blocks.

FIGS. 8B and 8C show how a small portion of a display is mapped to various structures in the memory controllers 754 using very fine-grained interleaving, where each pixel interleaving block is a single pixel. In FIG. 8B, the thin lines 805 delineate pixel boundaries. Each square is labeled with a "A" through "D" to indicate which memory controller owns the data for that pixel. Here, the fragment bookkeeping data is stored in the 9-bit fragment count and clip bookkeeping entries, where 16 entries fit in a single word. Each count and clip entry, described in more detail later, contains two items: the number of fragments in use by the corresponding pixel, and the window to which the pixel belongs. Since the pixel interleaving block size is so small, a word cannot contain data for a 4×4 block of adjacent pixels. Instead, four words, one from each memory controller, contain fragment bookkeeping information for an 8×8 block of pixels. The thick lines 810 delineate such groups of four words. Each word's fragment bookkeeping information is finely dispersed through the 8×8 block.

FIG. 8C is similar to FIG. 8B, but is interpreted somewhat differently. The same interleaving pattern from FIG. 8A is used, and the pixel interleaving block size is one pixel, but each square represents an entry in the fragment list array (described later). In this diagram, two words are allocated to each entry; these two words contain three or four fragments in the corresponding pixel's fragment list. Each page contains 64 words, or 32 entries. Due to the fine-grain interleaving of the embodiment of FIG. 8C, one page cannot contain fragment list data for an 8×4 (or 4×8) block of adjacent pixels. Instead, four pages, one from each memory controller, contain fragment bookkeeping information for a 16×8 block of pixels. (Alternatively, each group could contain data for an 8×16 block of pixels.) Each page's pixel data is finely dispersed through the 16×8 block, which is enclosed in thick solid lines.

Making a pixel interleaving block a single pixel maximizes load-balancing among memory controllers. However, this fine grain tends to spread out pixel data owned by a single memory controller, which reduces the effectiveness of various mechanisms that exploit two-dimensional locality of reference. In FIG. 8B, a 144-bit word contains 9-bit fragment bookkeeping information for sixteen pixels spread over an 8×8 pixel area, and so fetches of words in the fragment count and clip array are likely to occur more often than desired. For example, the two-pixel wide vertical line 815 only uses four of the sixteen entries in each of the four words.

Another related problem with fine-grain interleaving, which will be discussed later, involves allocation and deallocation of more overflow panes than is desired, which wastes both memory bandwidth and capacity.

To avoid these problems, larger pixel interleaving blocks may be assigned to each memory controller. FIG. 8D is similar to FIG. 8B, but with a 4×4 medium-grain pixel interleaving block size. Thin lines 820 still delineate 9-bit fragment count and clip entries, but wide lines 825 delineate single words, rather than groups of words. Each 4×4 pixel interleaving block contains data for sixteen pixels, and so requires an entire word. When painting a two-pixel wide vertical line 830, each memory controller makes eight accesses to a word. When painting a two-pixel wide line 835 that straddles two pixel blocks (and hence two words in different memory controllers), each memory controller makes four access to a word. On average, when painting a two-pixel wide vertical line, each memory controller makes seven accesses to a word, compared to four accesses to a word with the fine-grained interleaving in FIG. 8B.

FIG. 8E is similar to FIG. 8C, but with a 4×4 medium-grain pixel interleaving block size. Here, even the larger 4×4 pixel interleaving block size is not so large that an entire page's fragment list data can be contained in a contiguous block of pixels. Again, four pages, one from each memory controller, contain fragment list data for an 8×4 group of pixels, enclosed in thick solid lines. Data from a single memory controller is not finely dispersed across the 8×4 rectangle, but instead occurs in two 4×4 chunks. Medium-grain interleaving such as shown in FIGS. 8D and 8E causes short-term load imbalances among the memory controllers. One memory controller may get as many as sixteen consecutively generated fragments while the other three memory controllers get none. These short-term load imbalances can be handled by increasing the fragment buffering capacities of various portions of graphics accelerator 608, particularly the input queues of the pixel pipelines 750.

Even larger pixel interleaving blocks than the 4×4 blocks shown in FIGS. 8D and 8E may desirable for the efficient operation of several aspects of the invention. This must be weighed against the possibility that very large blocks may lead to long-term load imbalances. The extra buffering associated with larger pixel interleaving blocks deals only with the imbalances caused by each memory controller getting several consecutive fragments generated for one or a small number of physically adjacent objects. Implicitly assumed is that several consecutive objects will cover enough area to spread work evenly across all memory controllers. But if the pixel interleaving block size is too large, 3D models with high depth complexity may repeatedly render different surfaces to the same group of pixels, which are assigned to one or two memory controllers. This can starve the other memory controllers unless an inordinate amount of fragment buffering is provided.

The assignment of pages into banks further complicates the issue of interleaving granularity, as discussed in more detail below.

Overall Memory Organization

FIG. 9 shows the overall layout of graphics memory. All of the data structures described below are partitioned among the memory controllers. Each memory controller's data structures pertain only to pixels that are assigned to that memory controller.

At the bottom of memory (low memory addresses) are buffers containing several two-dimensional arrays of information, such as the screen buffer 910 and off-screen drawing buffers 920. The word "buffer" refers to either the screen or an off-screen buffer, as both have the same internal organization. Here, the screen is shown as a single buffer. In an alternate implementation, subsets of windows on the screen could be implemented as individual buffers. Each buffer includes both bookkeeping information about fragments, as well as a few fragments themselves. Specifically, each buffer includes bookkeeping information about the number of fragments for each pixel in the buffer; the first few fragments of each pixel; and bookkeeping information about where to find the next few overflow fragments, which are allocated in the overflow panes 950. Buffers are organized to provide a high utilization of memory bandwidth for the pixel information they describe. Buffers are allocated upward from the bottom of memory. Buffers may at time be moved lower in memory when memory is compacted by a software routine running on CPU 618 (FIG. 6).

Above the buffers is the linear fragment overflow map (LFOM) 930, which serves as a generic overflow map for any buffers that need more fragments than their statically allocated two-dimensional fragment overflow maps might provide for. For example, if a buffer can keep track of as many as six fragments per pixel, any pixels that require more than six fragments require the invention to find the location of the additional fragments by using the LFOM. Ideally, relatively few pixels require information about the locations of overflow fragments to be stored in the LFOM: the LFOM provides a more compact representation of the location of fragments than the two-dimensional fragment overflow maps in the buffers 910 and 920, but at the cost of lower utilization of memory bandwidth. A software routine moves the LFOM higher in memory when it allocates a new buffer above all previously allocated buffers. Software may move the LFOM lower when it compacts memory.

Allocated downward from the top of memory are overflow panes 950. A pane contains a fixed number of fragments at each pixel location. Depending upon the pixel interleaving block size, a pane may contain fragments for a rectangle of contiguous pixels, or may contain fragments for pixels dispersed over a larger rectangle. When one pixel in a pane needs more fragments than have been allocated for the pixels in the pane, a new pane that contains more fragments for all pixels in the pane is allocated. If only a few, or even none, of these other pixels require fragment storage in the pane, then memory capacity is wasted. Thus, the pane size may be smaller than a physical page, to reduce this over-allocation waste. Of course, smaller panes mean less opportunity for efficient prefetching of overflow panes. Overflow panes may be moved upward when memory is compacted.

Buffer Memory Organization

FIG. 10 shows a more detailed view of the components of a buffer, for example the screen buffer 910 (FIG. 9).

The two-dimensional fragment count & clip array (FCCA) 1010 contains a 9-bit record for each pixel in the buffer; a single 144-bit RAMBUS word thus contains information for sixteen pixels. In particular, each 9-bit record contains the number of fragments in use by the pixel.

The two-dimensional fragment list array (FLA) 1020 contains a fixed number of fragments for each pixel. These are the first few fragments for each pixel. In order to maintain such fragment data for a relatively large number of pixels per page, between one and four words are allocated per pixel. Depending upon the fragment format, this means any where from one to eight fragments per pixel are allocated in the fragment list array.

Also shown in FIG. 10 are two-dimensional Fragment Overflow Maps 1030. Each two-dimensional fragment overflow map (FOM) 1030 in a plurality of fragment overflow maps contains an 18-bit record for each pane of pixels. Each such record contains the memory address of, and the number of fragments used within, an overflow pane. Depending upon the expected number of fragments commonly used per pixel, there may be no fragment overflow maps 1030, or there may be several.

Each fragment overflow map 1030 contains an entry for every pane in the buffer, whether that pane is allocated or not, and so each fragment overflow map uses a significant amount of memory. On the other hand, the entries in the fragment overflow map have a high degree of spatial locality. Further, an entry's address can be directly calculated as a function of the pixel's x and y coordinates, whereas the LFOM 930 (FIG. 9) requires following in effect a linked list of panes. Thus, the FOM provides a much faster path to the allocated overflow panes than does the LFOM. In FIG. 10, two fragment overflow maps 1030-1 and 1030-2 are shown.

As with prior art, each of the three types of array partitions the drawing surface into rectangles of pixels, with each rectangle containing pixels for one page in a memory controller, or one page from each of the memory controllers. Since the data of the three types of arrays are of different sizes, these rectangles are of course different sizes.

Further, for the data that is smaller than one word, the respective rectangles are further partitioned into subrectangles, with each subrectangle containing pixels for one word in a memory controller, or one word from each of the memory controllers.

This partitioning into rectangles and subrectangles allows the invention to exploit the two-dimensional spatial locality inherent in drawing operations.

The Fragment Count & Clip Array

FIG. 11 shows a more detailed view of the components of the fragment count and clip array 1010 (FIG. 10). Each 9-bit record is divided into two fields: a 5-bit fragment count 1110 and a 4-bit clipping id 1115.

The fragment count 1110 contains the number of non-default fragments actually in use by the corresponding pixel. It is possible for the fragment count to be zero. An opaque default fragment that contains all sample points of the pixel is assumed to be behind all of the other fragments. This default fragment is stored in a register of the graphics accelerator, and contains red, green, and blue color components, a Z depth value (usually the maximum value), and Z gradients (usually 0). The alpha transparency component is assumed to be a constant 1.0. A pixel-specific sample mask is computed when needed: this contains whatever sample points are visible past the pixel's non-default fragments. If any portion of this default fragment is still visible at a pixel after the update, the default color is used in part to compute the pixel's composite color. This prior art technique reduces the number of memory accesses to update a pixel as long as any portion of the default fragment is still visible, as the default fragment does not need to be read or written. It also speeds the clearing of a buffer in preparation for drawing, as only a 9-bit field need be written per pixel, rather than a 144-bit word containing the default fragment. (Buffer clearing also causes overflow panes to be put back on free lists for reuse as described later; the default fragment technique does not affect the time spent recycling overflow panes.)

The clipping id 1115 is a 4-bit field to assist clipping of drawing operations to a window whose visible portion is sufficiently complex that it is not describable by the set of clipping rectangles provided in the graphics accelerator. In such cases, fragments may be generated for pixels that actually belong to another window. If the clipping id 1115 of a pixel does not match the current clipping id stored in a register, then no updates to the pixel are performed, as the pixel belongs to another window.

A 144-bit RDRAM word contains sixteen 9-bit fragment count and clip (FCC) entries. Each such word contains information only about pixels that are located in the same graphics memory segment (and its attached memory controller). If the pixel interleaving block size is 4×4 or larger, then each word in the fragment count and clip array (FCCA) holds the sixteen FCC entries for a 4×4 square of contiguous pixels, as previously described in conjunction with FIG. 8D. If the pixel interleaving block size is smaller, then each word in the FCCA contains entries for sixteen pixels, dispersed across an 8×8 rectangle of pixels, as previously described in conjunction with FIG. 8B. For example, using the 1×1 pixel interleaving granularity of FIG. 8B, one word of controller "A" contains the sixteen FCC entries for the sixteen pixels labeled "A" within the 8×8 square delineated with thick lines 810.

Though possibly larger than 4×4, the pixel interleaving block size is probably not so large (32×32) that a page of 64 words in the FCCA contains a contiguous group of pixels, all assigned to the same memory controller. Instead, the 1024 FCC entries in a page are dispersed across a 64×64 square of pixels. Each such 64×64 square contains 4096 FCC entries, 1024 from each of the four memory controllers.

Fragment Formats

FIGS. 12A and 12B depict two possible fragment formats. To fit across the page, each row shows 72 bits, (i.e., ½ of an RDRAM word).

In FIG. 12A, two 72-bit fragments fit into a single 144 bit word. Thin lines separate fields of the word, while thick lines delineate fragment boundaries. Each fragment contains 8 bits each of red, green, and blue color information, 8 bits of alpha transparency, 32 bits of Z depth, and 8 bits of a sample mask indicating which sample points of the pixel at which the fragment is visible. With this fragment format, the same Z depth value is used at each of the 8 sample points of a fragment to determine visibility of the sample point.

In FIG. 12B, three 96-bit fragments fit into two 144-bit words. The first fragment is allocated to the first 96 bits of the first word, the second fragment is allocated to the first 96 bits of the second word, and the third fragment is allocated to the last 48 bits of the first and second words. This odd configuration allows the use of simple, fast 2-to-1 multiplexors, with the same selector driving all multiplexors. But the main advantages of splitting only the third fragment across the two words is memory efficiency. The invention reads or writes a single word if only the first of the three fragments is loaded from or stored to graphics memory. It further writes a single word if only the information for the first or second fragment is modified, or if only the first fragment were in use, and a new second fragment is added behind the first fragment.

Each fragment in FIG. 12B contains a superset of the information shown in the 72-bit fragments of FIG. 12A. The additional fields are an 8-bit OpenGL stencil (labeled "stncl"), and 8 bits apiece of Z gradient information in the x and y direction (labeled "$\Delta Z_x$" and "$\Delta Z_y$"). The Z gradient information allows Z depth values to be more accurately recreated at each of the 8 sample points. Thus, surfaces that are very close to one another, or those that actually intersect, can be rendered with fewer artifacts by reducing the likelihood that a surface farther from the viewer will erroneously appear to "poke through" a closer surface.

Many other fragment formats are possible. These two formats illustrate that there may be an integral number of fragments per word of memory and that there may be an integral number of fragments spread across multiple words of memory.

The Fragment List Array

The fragment list array (FLA) 1020 (FIG. 10) contains storage for the first few fragments of each pixel of a buffer. If one word of storage is allocated per pixel, a 64-word page contains data for 64 pixels. If two words are allocated, each 64-word page contains data for 32 pixels. And if four words are allocated, each 64-word page contains data for sixteen pixels. Depending upon which fragment format is used, these possibilities allow any where from one fragment (and half of a third fragment) to eight fragments to be stored per pixel in the FLA.

If two words are allocated to each pixel in the FLA, then FIGS. 8C and 8E, as previously discussed, show examples of the partitioning of the screen into rectangles corresponding to a group of pages, one per memory controller. Each of the four memory controllers disperses its 32 pixels in a page across a 16×8 rectangle of pixels.

Overflow Panes

The FLA provides statically allocated storage for the first few fragments of each pixel. If a pixel needs more fragments, space is allocated in the overflow panes 950 section of graphics memory. In general, an overflow pane provides additional fragment storage for a group of pixels, all assigned to the same memory controller. For simplicity, overflow panes are described as allocating the same number of words per pixel as the FLA, though in the general case this need not be true. Even if an overflow pane does allocate the same number of words per pixel as the FLA, an overflow pane may in effect contain more fragments than the FLA. For example, if three fragments are allocated to two words, and the FLA allocates only a single word per pixel, then the FLA allows access to only the first fragment. The second word, stored in an overflow pane, allows access to two more fragments.

The total storage allocated in an overflow to all pixels in the pane may require fewer words than a full page provides, and so multiple overflow panes are allocated to the same page. Multiple overflow panes in a page are probably unrelated: they are not required to represent physically adjacent groups of pixels, or even to represent groups of pixels from the same buffer.

Pane Granularity

A buffer's pixels are partitioned into rectangular "panes." In one embodiment, each pane contains four times as many pixels as an overflow pane, with an equal number of pixels from each of the four memory controllers. If an overflow pane contains data for no more pixels than are in a pixel interleaving block, then a pane contains four subrectangles of pixels, where each subrectangle contains a contiguous group of pixels assigned to a single memory controller. If an overflow pane contains data for more pixels than are in a pixel interleaving block, then each memory controller's pixels are dispersed through the pane. Each overflow pane in a memory controller contains fragment data only for the pixels that are assigned to the memory controller within the corresponding pane.

As with the pixel interleaving block size, choosing pane size is a balancing act.

Smaller panes contain additional fragment data for a few pixels. If one pixel within the pane needs more fragments, so that an overflow pane is allocated, and the other pixels do not need more fragments, the over-allocation waste is small.

Larger panes have lower overhead for several operations. Each fragment overflow map contains an entry for every pane, and so fewer entries are required with larger panes. (This is a minor effect compared to the larger over-allocation waste, though.) Larger panes allow more accesses to each page that contains an overflow pane, and so increases opportunities for prefetching. Finally, larger overflow panes are allocated and deallocated less frequently, further increasing memory bandwidth efficiency.

These general characteristics of smaller and larger panes are affected by the relationship of the pane size to the pixel interleaving block size.

If the pane size is larger than the pixel interleaving size, the interleaving of memory controllers interferes with pane locality by spreading the pixels in an overflow pane over the entire pane. This has the effect of making overflow panes look "smaller" in terms of allocation and deallocation overhead (these operations occur more frequently than the overflow pane size would suggest), but appear "larger" in terms of over-allocation waste (since a memory controller's pixels in an overflow pane are spread out over a larger area, an overflow pane is less likely to be used by other pixels in the overflow pane). On the other hand, this dispersal substantially decreases the number of conflicting banks encountered when rendering an object or series of objects. FIG. 8C depicts the situation where each overflow pane contains fragment data for sixteen pixels, and the pixel interleaving block is one pixel. The pane size is 8×8 pixels; two such panes are shown enclosed by thick solid and dashed lines. Each pane contains sixteen pixels from each of the four memory controllers.

If overflow panes are no larger than the pixel interleaving block size, then they enhance locality of reference in overflow panes. That is, if a page containing an overflow pane is loaded into a bank on behalf of one pixel in the overflow pane, the probability that additional accesses will be made to the overflow pane on behalf of nearby pixels is maximized. Since the correlation between the number of fragments stored in pixels decreases with the distance between pixels, overflow panes that contain contiguous rectangles of pixels minimize this distance, and thus maximize the correlation. This situation is depicted in FIG. 8E, where again each overflow pane contains fragment data for sixteen pixels. In this case, though, the pixel interleaving block is 4×4. Each 8×8 pane contains four 4×4 subrectangles, where each subrectangle contains pixels only from a single memory controller.

The Fragment Overflow Maps

Each fragment overflow map (FOM) 1030 (FIG. 10) does not provide storage for fragment data itself, but instead provides information on where to find an overflow pane, which contains fragment data. For example, assume that two fragments are allocated per word as with the fragment format of FIG. 12A, and the FLA and overflow panes allocate two words per pixel. The FLA then contains the first four fragments for each pixel. Fragment overflow map 1030-1 contains entries describing where to find the next four (fifth through eighth) fragments for any pixels that need them, and fragment overflow map 1030-2 contains entries describing where to find the next four (ninth through twelfth) fragments for any pixels that need them.

Figure 13A:
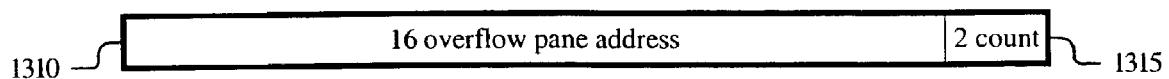
FIGS. 13A and 13B are diagrams of the fragment overflow map entry data structure associated with a drawing buffer.
Figure 13B:
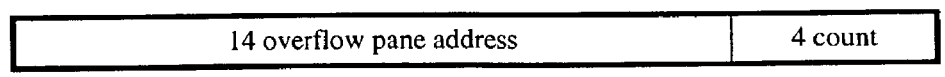

Each pane of a buffer has an entry in each FOM in each memory controller, whether the corresponding overflow panes are allocated or not. FIG. 13A shows the format for an FOM entry when overflow panes contain fragment data for four pixels. FIG. 13B shows the format when overflow panes contains data for sixteen pixels.

The overflow pane address 1310, if non-zero, indicates where in a graphics memory partition 756 an overflow pane is located. To obtain the address of the first word of the overflow pane, the overflow pane address 1310 is shifted left by the number of words in an overflow pane. If the overflow pane address 1310 is zero, no overflow pane is allocated.

The reference count 1315 is valid only for overflow panes that are allocated (the overflow pane address 1310 is non-zero). It contains one less than the number of pixels that have fragments in use on the overflow pane. It does not contain any information about the number of fragments in use on the overflow pane. There is no need to maintain a reference count value when none of the pixels has any fragments in use on the overflow pane. In this case, the overflow pane is recycled (put back onto the appropriate free list), and the FOM entry's overflow pane address 1310 is zeroed.

The dividing line between the overflow pane address 1310 and the reference count 1315 depends upon the overflow pane size. The reference count 1315 must be able to contain a value equal to the number of pixels in an overflow pane minus one. Thus, in FIG. 13A, overflow panes contain data for four pixels, so the reference count 1315 is two bits. In FIG. 13B, overflow panes contain data for sixteen pixels, so the reference count 1315 is four bits. In general, overflow panes containing data for $2^n$ pixels allocated n bits to the reference count, and 18-n bits to the overflow pane address.

The amount of overflow pane memory that is addressable is independent of the overflow pane size. To compute the word address of an overflow pane, the overflow pane address 1310 is multiplied by the number of words in an overflow pane. This is equivalent to shifting left by the number of bits allocated to the reference count 1315, then multiplying by the number of words per pixel. At a minimum, when one word per fragment is allocated, an individual memory controller can address $2^{18}$ words, or 4.5 megabytes, with this scheme. This would severely limit the memory allocated for overflow panes.

This banking assignment techniques described later avoid banking conflicts as the subsequent overflow panes for a pixel are accessed. Effectively, the addressable memory can be multiplied by the number of banks, since the overflow panes for any given pixel cycle through all the banks in a known pattern. When an overflow pane address is retrieved from the FOM, the computation of the word address must be modified to place the address into the non-conflicting bank that follows the bank of the previous overflow pane. If one word per pixel is allocated in each overflow pane, this increases the memory that can be addressed by a memory controller to 144 megabytes (32 banks), 72 megabytes (16 banks), or 18 megabytes (4 banks). If more memory must be addressed, the FOM entries can be increased to 36 bits.

The overflow pane size is a parameter that is set when the graphics device is started up. For example, some users may use relatively few fragments per pixel. These users are not concerned with memory usage, and so would be most satisfied with larger panes that improve prefetching opportunities, and that have low allocation and deallocation overhead. Other users may use many fragments per pixel, and so would be happiest with small panes that place a higher value upon efficient memory capacity usage than upon efficient use of memory bandwidth.

Similarly, the number of fragment overflow maps may be selected on a per-buffer basis. In particular, off-screen buffers intended for use with typical 2D application interfaces (e.g. the X11 Window System, or Microsoft Windows GDI) do not allow partial coverage of sample points, and so contain at most one fragment per pixel. Such buffers don't need any fragment overflow maps. On the other hand, the overhead of a fragment overflow map is relatively small for 3D buffers and windows, wherein ⅛ of a word describes a pane, which in turn might contain 4 to 32 words of fragment data. In such cases, allocating several fragment overflow maps is probably preferable to using the linear fragment overflow map described below, as it is comparatively inefficient in its use of memory bandwidth.

A 144-bit RDRAM word contains 8 18-bit FOM entries. Like all other pixel data, each such word contains information only about pixels that are located in the same graphics memory segment (and its attached memory controller). But unlike the FCC entries, which describe a single pixel, each FOM describes an entire pane. The 8 FOM entries in a word are organized to describe as square an area as possible in the buffer, as are the 64 words in a page in the FOM. Thus, continuing the example of 8×8 panes, each word describes overflow panes for a 32×16 pixel rectangle, and each page describes overflow panes for a 256×128 pixel rectangle.

The Linear Fragment Overflow Map

Some buffers may use large numbers of fragments for some pixels, especially if many partially transparent surfaces. The device may allow a pixel to allocate the maximum 31 fragments for a single pixel that can be described by the fragment count 1110 in an FCC. However, allocating 15 FOMs may use an undesirable amount of memory if only a few pixels need large numbers of fragments. The linear fragment overflow map (LFOM) 930 (FIG. 9) provides a general overflow mechanism for fragments that overflow beyond whatever FOM maps are allocated for a buffer.

In the simplest implementation, use of the LFOM requires that a buffer has at least one FOM. The address of an overflow pane accessed through the buffer's last FOM provides an index into the LFOM for finding the next overflow pane. One ordinarily skilled in the art and having the benefit of this disclosure could easily allow a buffer to have no FOM, yet access overflow panes, by extending the LFOM indexing scheme to accommodate using a pane address within a buffer to index the LFOM to find the first overflow pane.

The LFOM uses the same entry format as the FOM, as shown in FIGS. 13A and 13B. However, these entries are not grouped into rectangles, nor addressed with a two-dimensional ($x_{pane}$, $y_{pane}$) address relative to a specific buffer. Instead, the LFOM entries are linearly addressed. An index into the LFOM is created by shifting the physical address of an overflow pane right several bits, and shifting in "1" bits so as to create a relatively small negative number. This negative number is then added to a pointer to the top of the LFOM, creating a pointer in which the least significant three bits indicate the LFOM entry within a word, and whose most significant bits indicate the word address of the LFOM entry. This LFOM entry describes the next overflow pane. The address of this second overflow pane can be used to then find a third overflow pane, etc. As with the FOM, the computation of the address of the next overflow pane requires modifying the address to be in the next bank in the cycle of banks, as discussed later.

Figure 14:
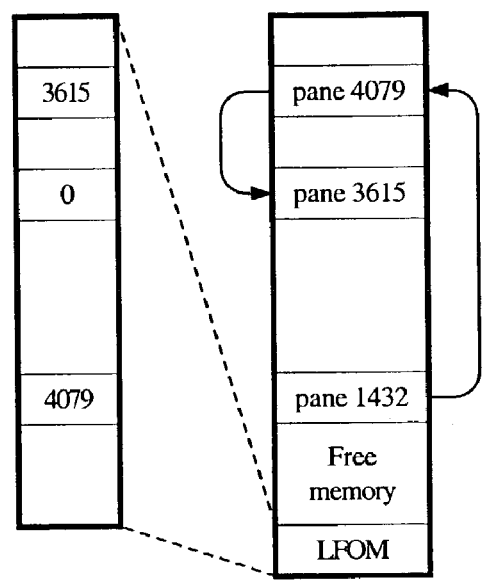
FIG. 14 is a diagram of a linked list of overflow panes in the linear fragment overflow map.

FIG. 14 shows an example of the LFOM at work. On the right side is a picture of the upper portion memory, viewed as a linear sequence of panes. The very bottom of this memory area (just above the buffers) is the LFOM. Above that are free memory and then overflow panes. The arrows show how one overflow pane at overflow pane address 1432 links to another at overflow pane address 4079, and then how that overflow pane links to the overflow pane at address 3615, which is the last overflow pane in the chain. Note that the overflow panes themselves do not contain the link information shown by the arrows. The link information is kept in the LFOM.

The left side shows the pointer fields of the LFOM in more detail. The LFOM contains the pointer information represented by the arrows on the right side. A buffer's last FOM contains an entry with an overflow pane address of 1432. Since this is the last FOM for the buffer, it is necessary to use the LFOM to find the rest of the overflow panes. At a location indexed by the address of overflow pane 1432, the LFOM has an entry containing the overflow pane address 4079. At a location indexed by the address of overflow pane 4079, the LFOM has an entry containing the overflow pane address 3615. At the location indexed by the address of overflow pane 3615, the LFOM has an entry containing the overflow pane address 0, indicating that there are no further overflow panes.

The LFOM entries cannot be allocated in two dimensions, so each RDRAM word contains overflow information for 8 linearly consecutive panes in physical memory. When following links, it is unlikely that there will be any sharing of LFOM entries within a word, or even a page. Even so, access to fragments via the LFOM is faster than prior art as long as overflow panes are larger than two pixels. Since there is a rough correlation in fragment list length among nearby pixels, it is likely that any overflow pane accessed through the LFOM contains fragments in use by several pixels, not just a single pixel. Further, if one of these pixels is updated with a fragment, it is fairly likely that other pixels with fragments in the same overflow panes will be updated soon.

Bank Interleaving when Overflow Panes Contain at Least a Page of Fragment Data Since non-conflicting DRAM banks may be simultaneously open or prefetched, it is desirable to partition the fragment data belonging to a memory controller among its banks in such a way that the memory controller can usually prefetch pages that it will access in the near future. The bank interleaving schemes described below increase the probability that a small number of pages accessed sequentially by a memory controller do not conflict with one another.

In areas of the screen in which pixels have fragments stored only in the FLA, "neighboring" pages in the FLA should not conflict. If possible, a page's neighbors' neighbors should not conflict, either. A first and second FLA pages are considered "neighbors" if the fragments generated for a single object (or a sequence of adjacent objects) update pixels on the first page, and then pixels on the second page, with no intervening pages between the two. As will be discussed later, neighboring pages may not contain physically adjacent rectangles of pixels, but may contain physically distant rectangles of pixels.

In areas of the screen in which pixels have many fragments stored in several overflow panes, the pages in which overflow pane panes are allocated for a given pixel should not conflict with one another or with the page in the FLA.

And in areas of the screen in which many pixels require a single overflow pane, an FLA page, its first overflow page, and any FLA and first overflow pages for neighbors should be in non-conflicting banks. If this is impossible, at worst the overflow pages in neighboring panes should conflict with one another. Because an access to an FLA page will occur between two overflow pages, conflicts between overflow pages still leave some opportunity for prefetching.

Dynamic allocation of overflow panes prohibits some bank assignment schemes that are possible with static allocation of fragment storage. If each pixel is statically allocated a maximum number of fragments, where each pixel's fragments are distributed across multiple pages, it is possible to use banking patterns in which a subset of banks are used for the pages containing the first few fragments, another subset for the pages containing the next few fragments, etc. With dynamic allocation, some panes will need no overflow panes, while some will need several. Thus, such a subset approach to bank assignment uses memory inefficiently. In particular, the subset of banks assigned to the FLA would be overused, while the subsets assigned to the overflow panes would be underused.

The invention instead equally distributes all banks across the FLA data, then all banks across the first overflow panes, then the second overflow panes, etc. Since most buffers will have a large number of panes compared to the number of banks, this ensures a fairly small variation in the amount of fragment data allocated in each bank.

We first discuss bank assignments where an overflow pane contains a page of fragment data. This is easily extensible to situations in which an overflow pane contains multiple pages of data. Banking assignments where an overflow pane contains less than a page of fragment data are discussed later.

Figures 15A, 15B, 15C:
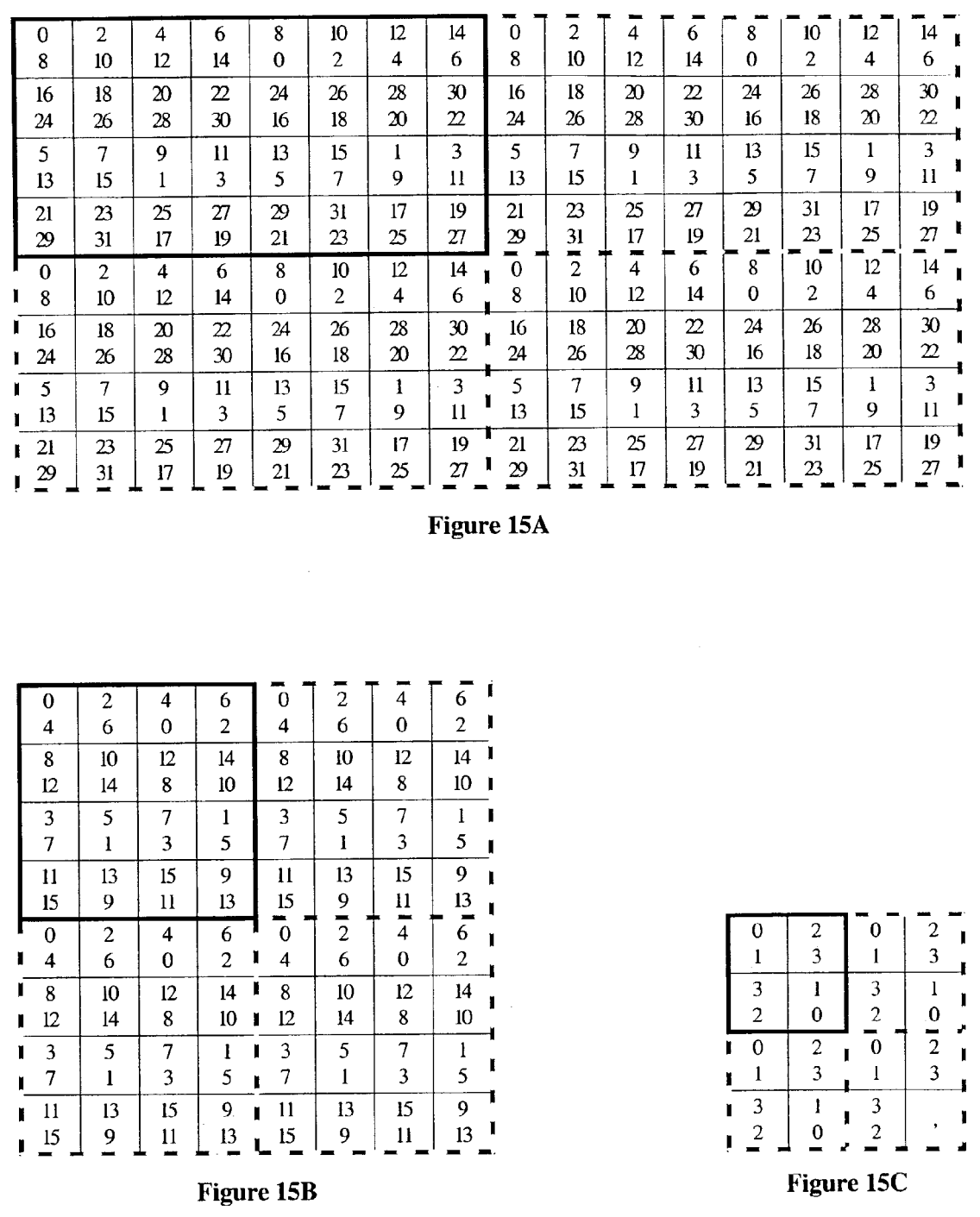

FIG. 15A shows a bank interleaving pattern using 32 dependent banks, where overflow panes contain a full page of data. This diagram applies directly to a graphics accelerator with a single memory controller, and is a good representation for multiple memory controllers using fairly fine-grained memory controller interleaving. The diagram is deceptive for multiple memory controllers with larger grain interleaving; this situation is addressed shortly.

Each thin-lined square represents a pane. Each pane contains four pages of data, one from each memory controller, in the FLA. Each pane also maps to four pages of data, one from each memory controller, at each level of overflow panes, if such overflow panes are allocated. The first (top) number in each square is the bank assigned to each of the four pages in the FLA. (Since the pages are in different memory controllers, assigning the same bank does not cause any bank conflicts.) The second number is the bank assigned to the first overflow pane pages. (Bank assignment for further levels of overflow are discussed later.) The complete pattern is shown in the thick solid line square in the upper left corner; this same pattern is repeated in the other three dashed thick line squares merely to show how banks are assigned in a non-conflicting manner at the edges of the bank interleaving pattern. Note that to allocate the same amount of memory in each bank, in the basic pattern each bank occurs exactly once as an FLA page, and exactly once as a first level overflow page.

If ($x_{pane}$, $y_{pane}$) represent the x and y coordinates of a pane, then the FLA bank shown in FIG. 15A is computed as:

$$\text{fla\_bank}=((2*f+1)*y_{pane}[1]+2*x_{pane}[2:0])[3:0]+16*y_{pane}[0]$$

where f is 2, and the first overflow pane as:

$$\text{overflow}[1]=((2*f+1)*y_{pane}[1]+2*x_{pane}[2:0]+8)[3:0]+16*y_{pane}[0]$$

A bank conflict occurs if a page in bank n is open, and it is desired that a page in bank n−1 or n+1 be open simultaneously, except that in a 32-bank DRAM, banks 15 and 16 do not conflict. There are no bank conflicts moving in any of 8 directions for accessing the first few fragments stored in the FLA. That is, looking only at the top bank number in each square, which represents the bank assigned to the FLA data of each page, all eight surrounding squares have a non-conflicting bank number, so that the FLA pages for any two adjacent squares can be simultaneously open. In most cases a third and fourth square's FLA page oriented in line with the first two pages can be open as well. Note that most objects will not generate fragments that move directly to a diagonal neighbor, but will instead generate fragments that move from page to page horizontally and vertically, and so the multiple open pages usually look like an irregular staircase. Thus, the pattern allows several open pages in the FLA for portions of the screen in which fragment lists are short, and so that data accesses tend to move from FLA page to FLA page, rather than into overflow panes.

This bank interleaving pattern has no conflicts even when the first overflow pane is taken into account. Looking at both bank numbers in a square, in all cases all eight surrounding squares have non-conflicting bank numbers. That is, for all pairs of adjacent squares, all four banks can be simultaneously open. And in fact, in many cases a third and fourth pair of pages can be open as well.

With thirty-two independent banks, no matter what value is chosen for f, no adjacent blocks conflicts. Choosing a good value for f thus depends more upon interactions with more distant blocks. In FIG. 15A, the bottom half of the banking pattern has been offset from the top half by 5 (f is 2), rather than by 1 (f is 0). This pushes conflicts that would otherwise be two vertical blocks away into the diagonals. With no interleaving, or with fine-grained interleaving, this makes such conflicts "farther" away, as most paths to such blocks will step horizontally and vertically through other blocks.

Unfortunately, FIG. 15A is deceptive when the interleaving of memory controllers is taken into effect. Interleaving opens gaps that make it possible for an object to traverse some distance through pixels belonging to other three memory controllers before hitting more pixels belonging to the specific memory controller. The larger the pixel interleaving block size, the larger the gaps, and the larger the set of probable neighboring pages within a specific memory controller. In the worst case, the pixel interleaving block size represents a page of data in the FLA and overflow panes. This explosion in neighbors makes it impossible to assign banks with the desired properties.

Figure 16A:
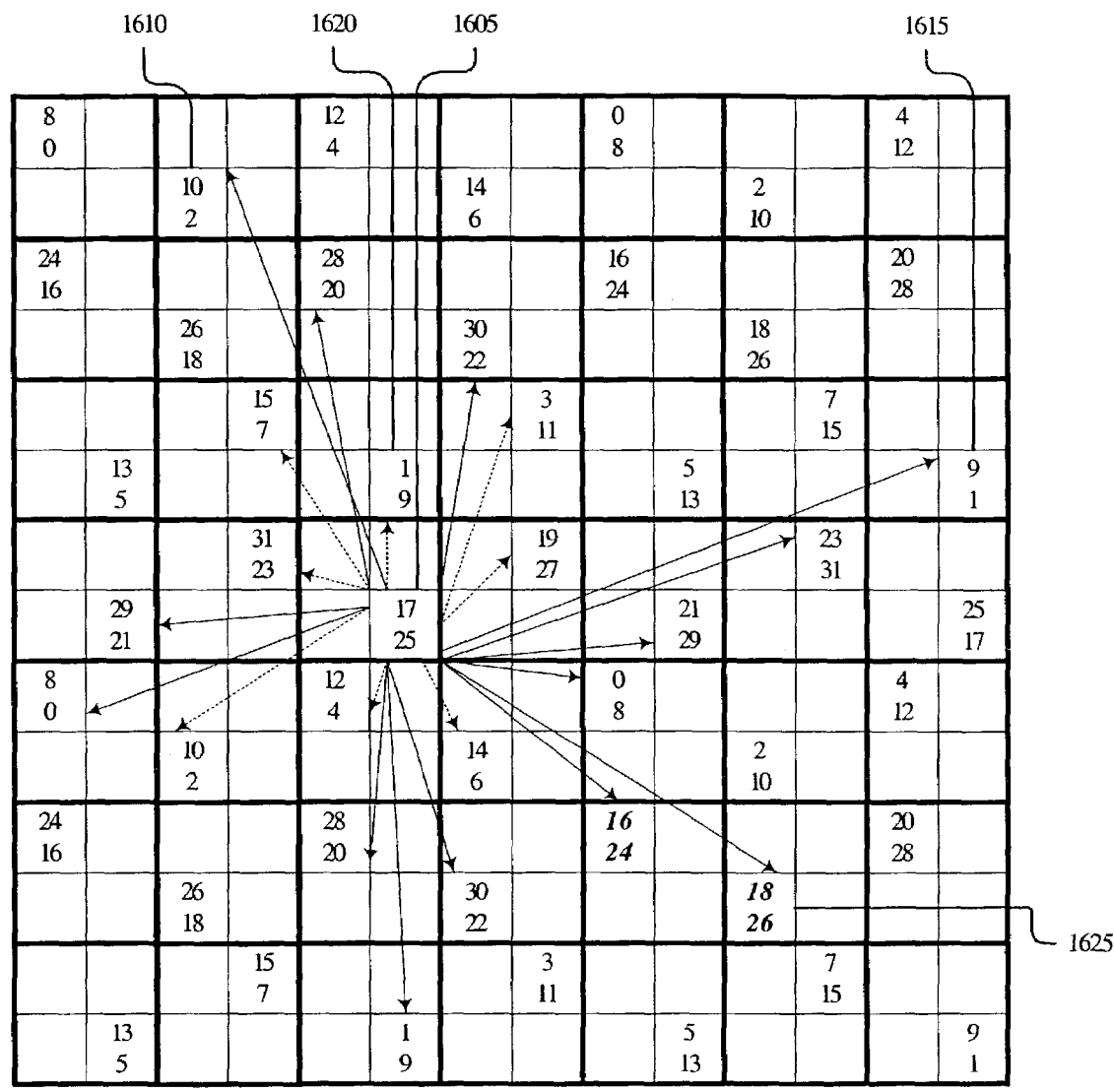
FIGS. 16A, 16B, and 16C are diagrams of conflicts between banks under medium-grain interleaving.

FIG. 16A, for example, shows a portion of the screen, in which four words are assigned to each pixel in the FLA and overflow panes, so that 64-word pages hold fragment data for sixteen pixels. (For illustration purposes, FIGS. 16 use square pages, which maximizes the number of neighbors.) The pixel interleaving block size is 4×4 pixels, so that each FLA and overflow pane page is a contiguous block of 4×4 pixels. Each such block is shown as a thin-lined square. Panes are 8×8 pixels, and are shown as thick-lined squares. In this diagram, only the blocks belonging to memory controller "C" are labeled with bank assignments, so as to make the object paths more clear. Each block belonging to memory controller "C" is labeled similarly to blocks in FIG. 15A-*the* top number is the bank assigned to the page in the FLA, while the bottom number is the bank assigned to the page of the first overflow pane.

Each solid or dashed arrow shows the path a narrow object might take after generating fragments for pixel interleaving block 1605. Each arrow terminates when it hits another pixel interleaving block (e.g. 1610, 1615, 1620, 1625) that also belongs to memory controller "C". All blocks with an arrow to them are neighbors of block 1605, even though they are not physically adjacent. For each such neighbor, an appropriate object can be chosen so that memory controller "C" will receive fragments destined for block 1605, and next receive fragments from the same object destined for the neighboring block. The blocks which present some sort of bank conflict, where not all four banks (two from the starting block, two from the terminating block) can be open simultaneously (e.g. 1625) are indicated with bold italicized bank numbers.

Paths to the "adjacent" 8 neighbors from FIG. 15A are shown with dashed arrows. Another fourteen paths to neighbors that arise due to interleaving are shown with solid arrows. (Several other paths to even more distant blocks are not shown.) If a narrow band of adjacent objects that curves is rendered, for example, a triangle strip for a portion of a highly-tessellated sphere, an even larger set of blocks can be considered neighbors to block 1605.

With more than twenty-two neighbors, it seems impossible to satisfy our desired criterion that neighboring blocks be assigned into different, non-conflicting banks in a 32-dependent bank RAMBUS DRAM. However, the pattern does quite well. Only two of the twenty-two paths result in a conflict. Both these are between two FLA pages.

FIG. 15B shows a bank interleaving pattern using sixteen dependent banks, and the same conventions of FIG. 15A. Sixteen dependent banks cannot do as well as 32 banks. There are no conflicts between FLA banks, but banks 7 and 8 have an FLA/overflow page conflict in two places.

The FLA bank shown in FIG. 15B is computed as:

$$fla\_bank=((2*f+1)*y_{pane}[1]+2*x_{pane}[1:0])[2:0]+8*y_{pane}[0]$$

where f is 1, and the first overflow pane as:

$$overflow[1]=((2*f+1)*y_{pane}[1]+2*x_{pane}[1:0]+4)[2:0]+8*y_{pane}[0]$$

It is also possible to offset the bottom half of the pattern by 5 (f is 2) rather than 3 (f is 1), which creates more conflicts, but places all conflicts on diagonals.

The two patterns in FIGS. 15A and 15B can be generalized as:

$$fla\_bank=((2*f+1)*y_{pane}[1]+2*x_{pane}[lb-3:0])[lb-2:0]+(b/2)*y_{pane}[0]$$

$$overflow[1]=((2*f+1)*y_{pane}[1]+2*x_{pane}[lb-3:0]+b/4)[lb-2:0]+(b/2)*y_{pane}[0]$$

where b is the number of banks, lb is $\log_2(b)$.

If fewer conflicts are desired with sixteen dependent banks, note that the conflicts arise due to the shared sense amps for dependent banks. There are no conflicts in FIG. 15B between two even banks, nor two odd banks, only between an even and an odd bank. The top half of the pattern can be replicated, and the same for the bottom half, to create a 4×8 bank pattern with the same number of conflicts (at the boundary between even and odd banks) over twice as much area.

Figure 16B:
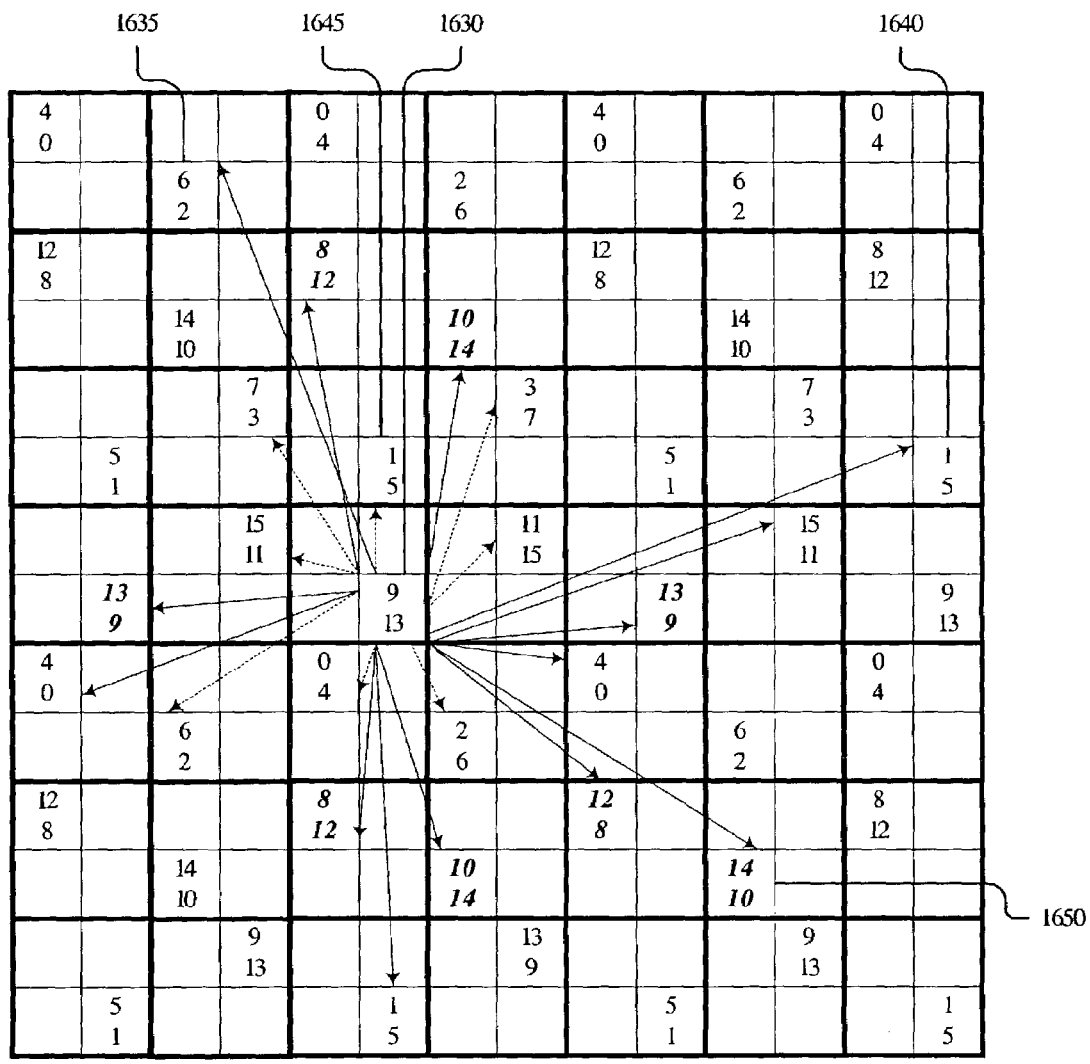

The sixteen dependent bank interleaving pattern in FIG. 15B has many more conflicts when mapped onto a medium grain memory controller interleaving pattern, as shown in FIG. 16B. FIG. 16B uses the same conventions as FIG. 16A. But with half as many banks, eight of the 22 paths have conflicts, and four of these are conflicts between two FLA pages. (Different choices for f can reduce the conflicts in this particular example at the cost of increasing conflicts for other blocks.)

FIG. 15C shows a bank interleaving pattern for four independent banks. Here, since the banks are independent, only identical bank numbers conflict. The limitations of four non-conflicting banks show up even in this idealized diagram.

The FLA and overflow banks shown in FIG. 15C are computed as:

$$fla_{13}bank=(3*y_{pane}[0]+2*x_{pane}[0])[1:0]$$

$$overflow[1]=(1+*y_{pane}[0]+2*x_{pane}[0])[1:0]$$

Figure 16C:
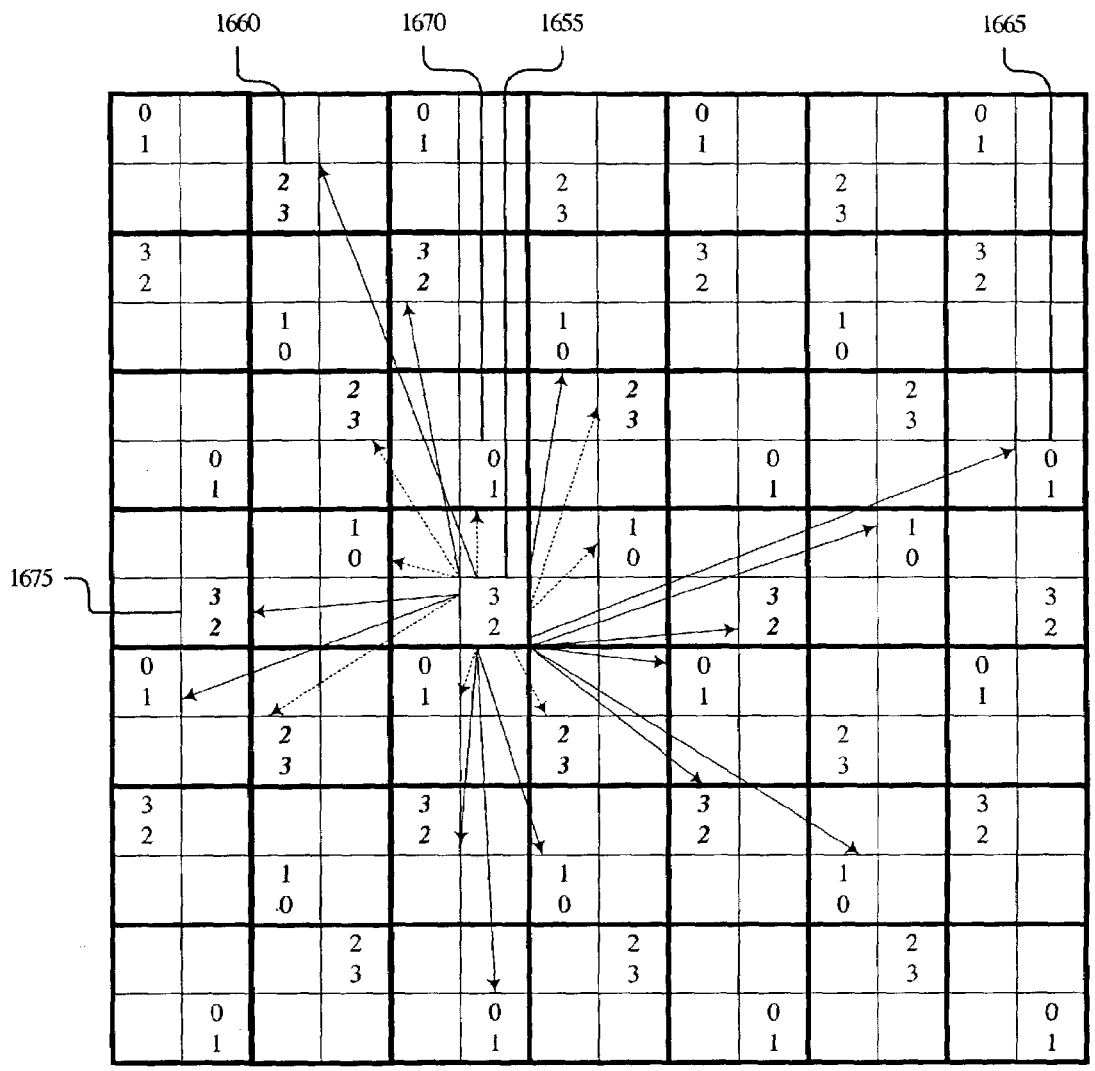

Not surprising, this pattern has even more conflicts when mapped onto a medium grain memory controller interleaving pattern, as shown in FIG. 16C. Ten of the twenty-two paths have conflicts, and five of these are conflicts between two FLA pages.

The conflicts for the 32-independent banks shown in FIG. 16A are minor, and the pixel interleaving block size can be chosen without regard to its effect upon bank conflicts. However, the conflicts for the 16-independent bank system, and in particular the 4-dependent bank system, are more problematic. To reduce bank conflicts, it is necessary to reduce the average number of neighbors per object, or reduce the percentage of conflicting neighbors, or both.

In one embodiment, the invention uses fine-grained interleaving to increase the probability of neighbors that are physically adjacent, and reduce the probability of neighbors that are physically distant. Fine grain interleaving accomplishes this in two ways. First, the "holes" created by other memory controllers for objects to slip through are much smaller (e.g. 1×1 pixels rather than 4×4 pixels), so objects have to be much thinner to avoid nearby pixels in the same memory controller. Second, an object has to slip through many such holes to get all the way through an adjacent page so that it can next touch pixels on a physically distant page. Of course, fine-grained interleaving has several negative consequences for overflow pane overhead, as previously discussed.

Figure 17A:
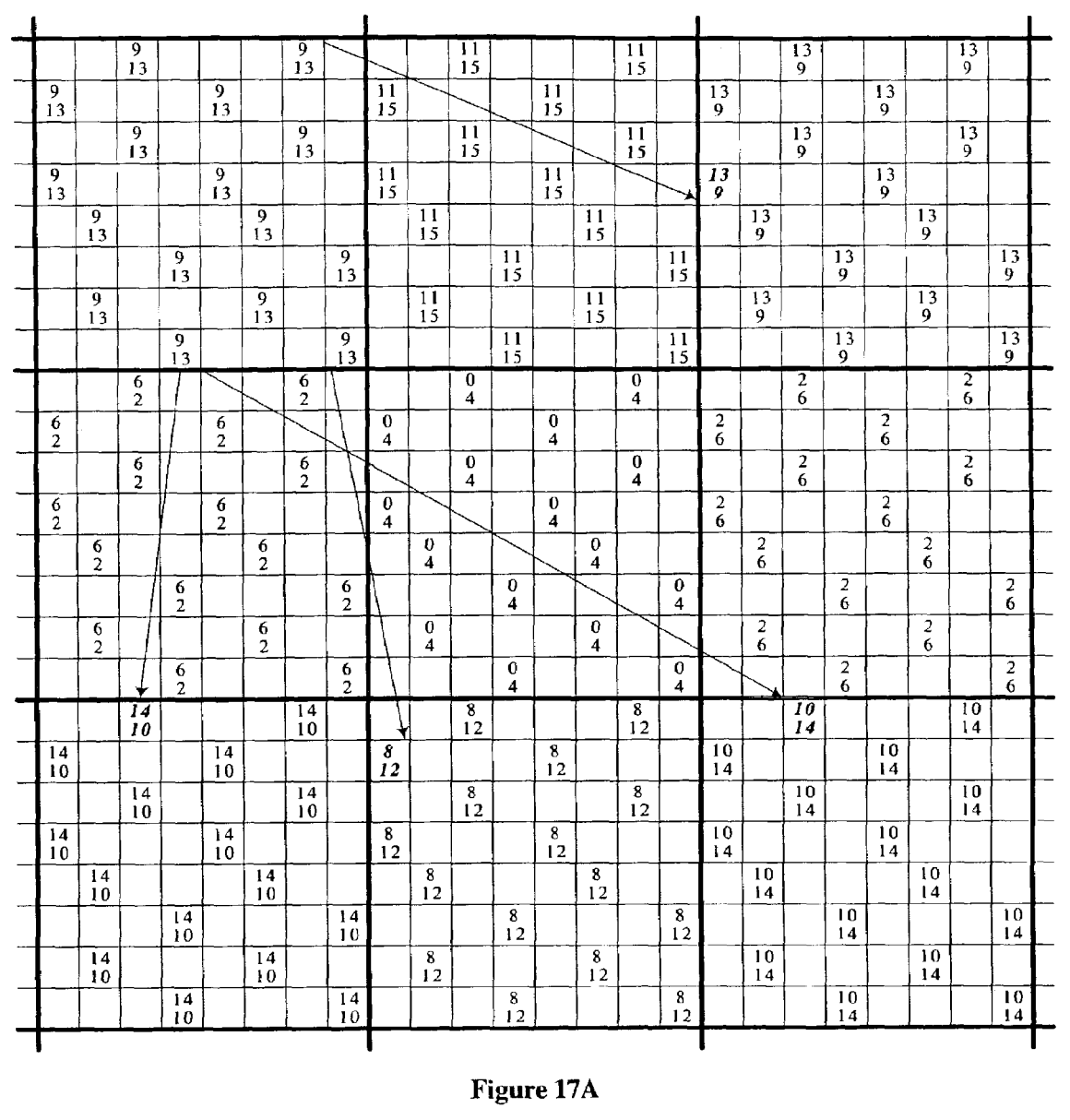

With fine-grained interleaving, the eight physically adjacent squares to a given square in FIGS. 15A-15C, are by far the most likely neighbors that a given memory controller will encounter. That is, almost all objects that generate fragments for one square will next generate fragments for one of the physically adjacent squares. Further, the four vertical and horizontal physically adjacent neighbors are more likely than the four physically adjacent diagonal neighbors FIG. 17A shows how fine-grain interleaving can dramatically reduce the probability of conflicts with sixteen dependent banks. Each small square represents a single pixel. Each 8×8 square of pixels is enclosed in thick lines, and represents a group of four pages in the FLA, and four in the first overflow panes, one page of each per memory controller. Only pixels assigned to memory controller "B" are labeled; the top number is the bank the FLA page is in, and the bottom number is the bank the first overflow page is in.

A few paths showing conflicts are shown with solid arrows. Again, such paths terminate at pixels whose bank assignment is bold and italicized. These paths must pass all the way through a physically adjacent group of pages, which are stored in non-conflicting banks, without containing a single sample point from a pixel assigned to memory controller "B". Note how thin and precisely oriented these paths have to be to avoid passing through closer, non-conflicting pixels in memory controller "B", especially since small squares in FIG. 17A represent single pixels, rather than the 4×4 blocks of pixels depicted in FIG. 16B.

Although all conflicting paths shown here completely avoid non-conflicting pixels, this is not strictly necessary. An extremely thin object may behave like a neutrino, passing right through several non-conflicting pixels by slipping between sample points, before it finally encloses a sample point in a distant conflicting pixel. In both cases, the thinness required of an object that takes a conflicting path strongly suggests that fragment generation, rather than frame buffer update operations, will be the performance bottleneck. Most such conflicts are unlikely to impact performance much.

Figure 17B:
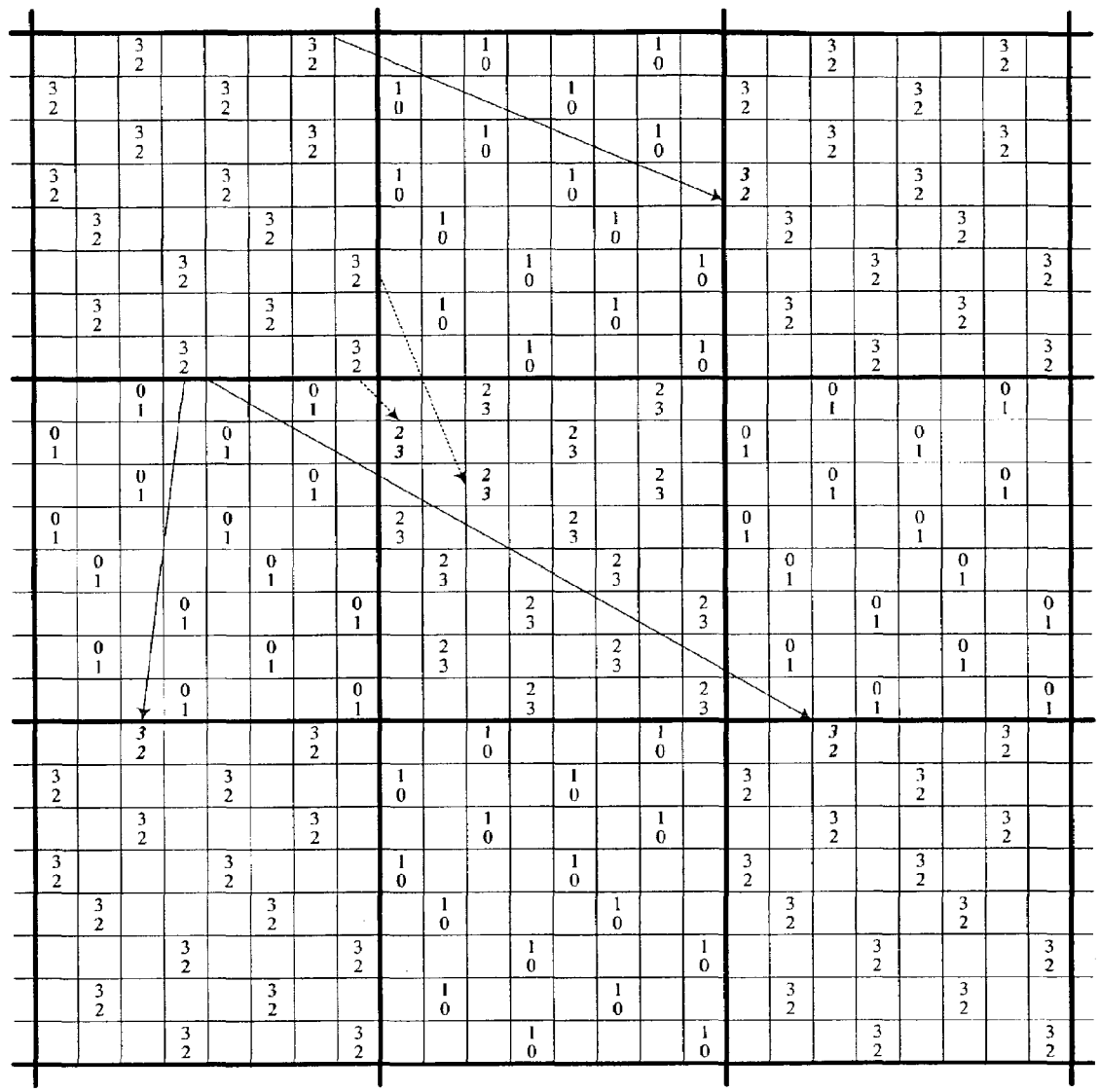

FIG. 17B shows fine-grained interleaving with four independent banks. Here conflicts are somewhat more abundant, as diagonal paths from one group of pages to another conflict, and the gaps left by the other three memory controllers make such paths reasonably likely.

In two alternate embodiments, the invention reduces the average number of conflicting neighbors by using a very large grain interleaving of memory controllers. One alternate embodiment increases the pixel interleaving block size by a factor of two in both dimensions, then assigns four different banks in the FLA, and another four in the first overflow panes, for each pixel interleaving block. This partitioning of a pixel interleaving block into four different banks reduces bank conflicts somewhat. For any of the four banks within a pixel interleaving block, ¼ of the paths exiting the bank enter one of the other three non-conflicting banks within the same block.

Figure 18A:
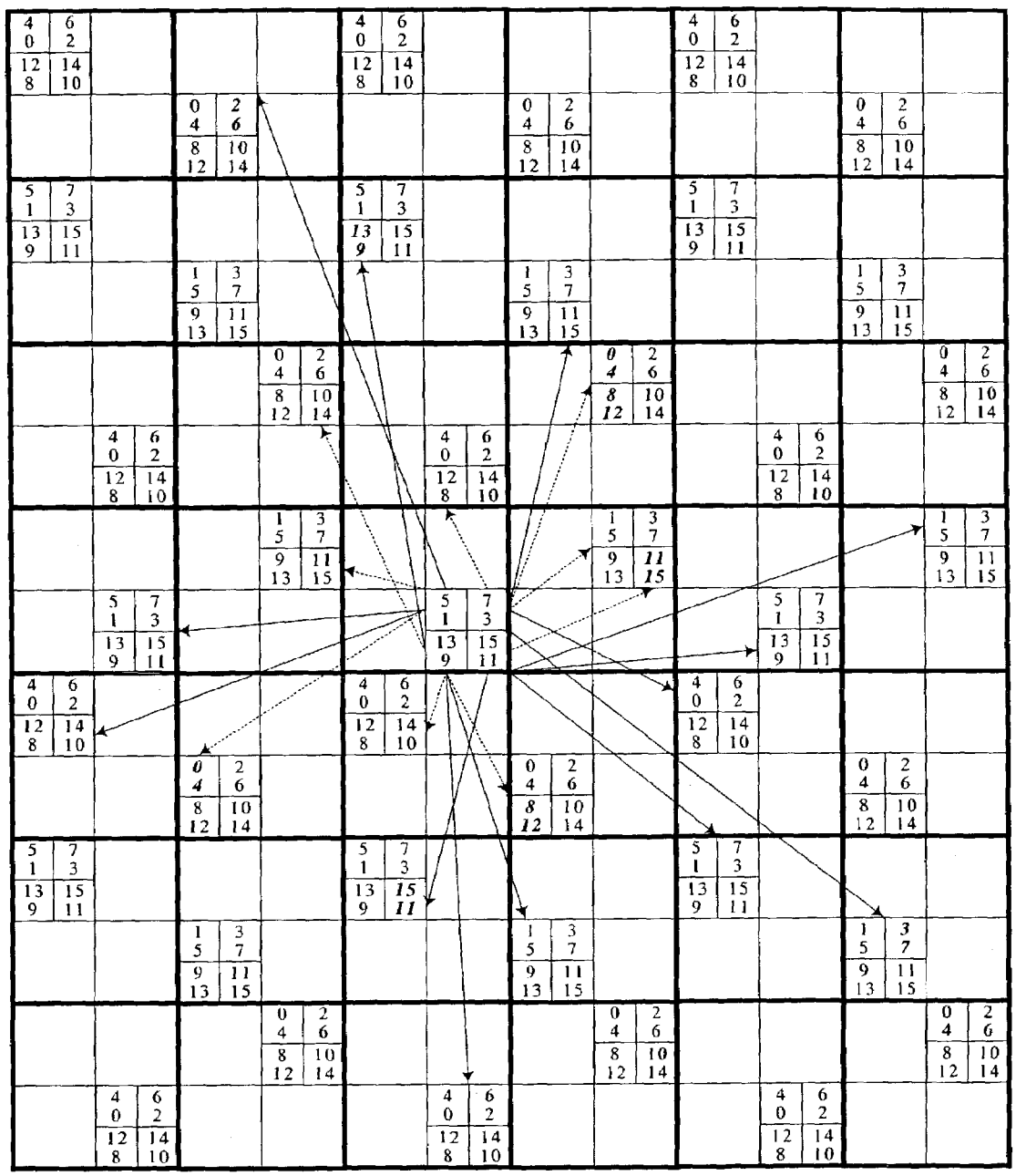
Figure 18B:
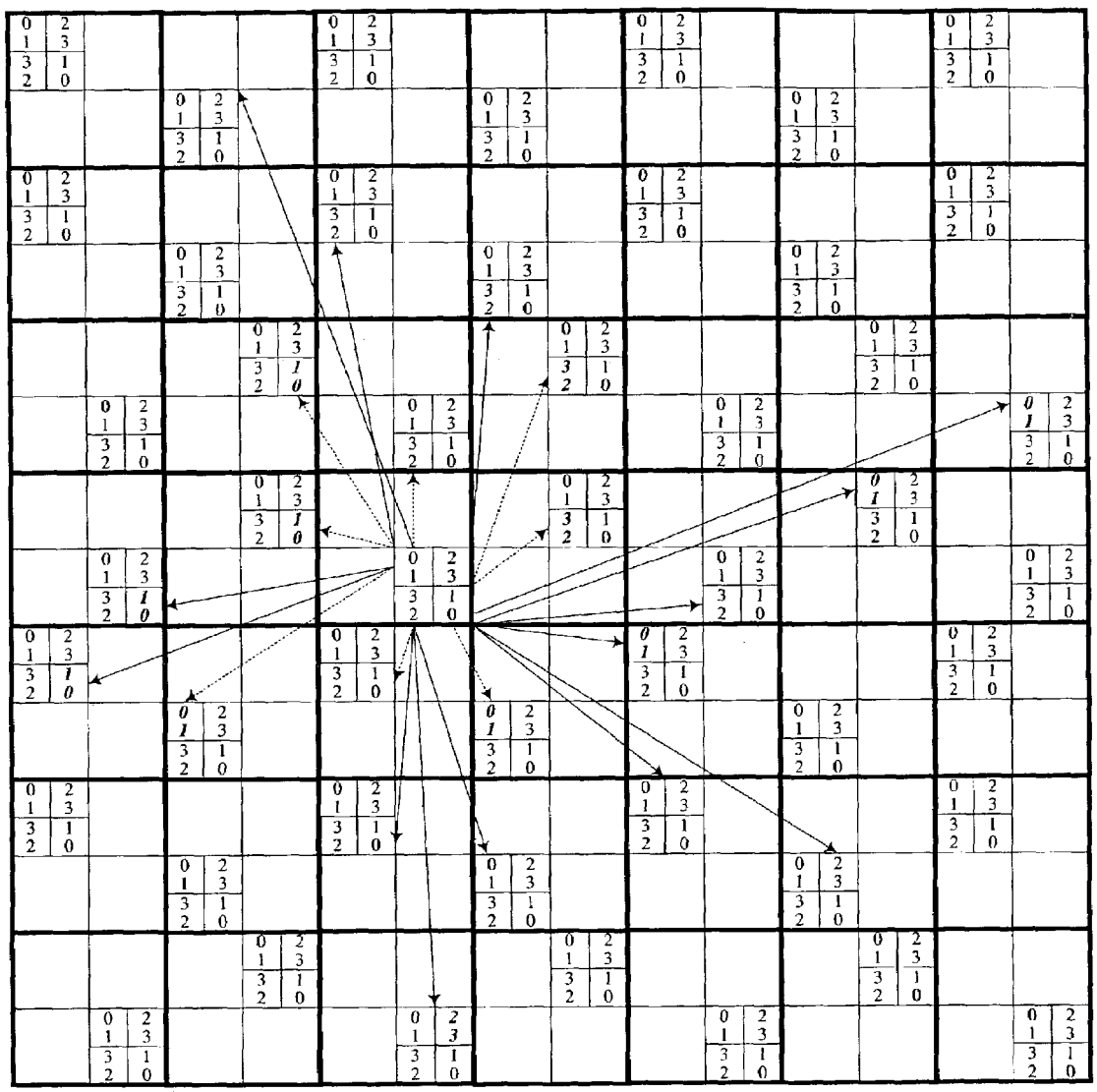

FIG. 18A shows some conflicting and non-conflicting paths for a pixel interleaving block in memory controller "C". In the example, shown in FIGS. 18A, the interleaving block size is 8×8 pixels, and sixteen dependent banks are available. Because each pixel interleaving block is composed of four subblocks, some paths from one block to another may conflict (that is, their subblock bank assignments conflict), while other paths between the same blocks (but different subblocks) do not conflict. FIG. 18B shows a similar diagram with four independent banks. In both diagrams, conflicting paths between subblocks terminate in a subblock with bold italicized bank assignments.

Figure 18C:
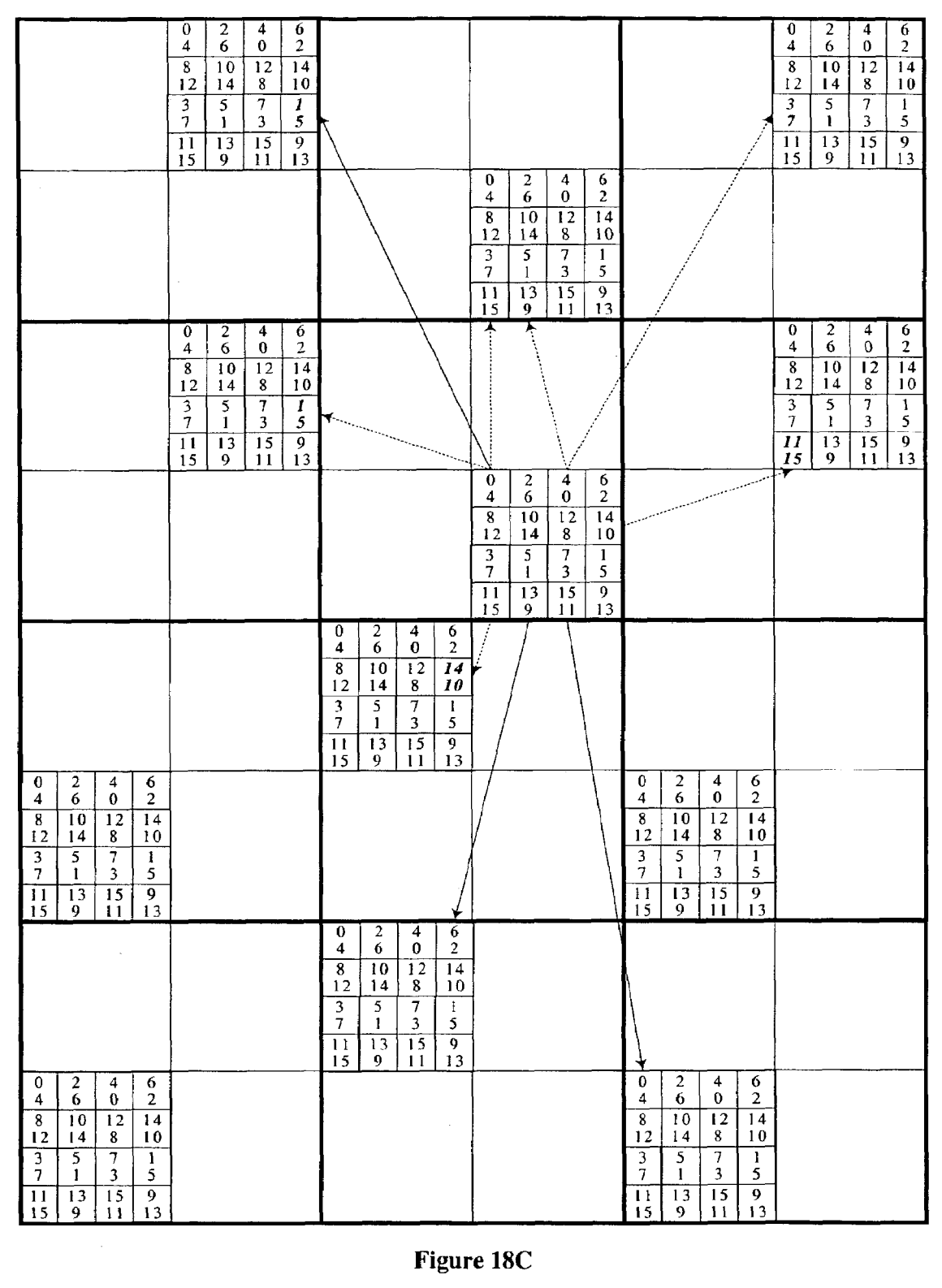

If there is sufficient buffering in the system, a second alternate embodiment uses even larger pixel interleaving blocks, subdivided into sixteen subblocks. If sixteen dependent banks are available, each pixel interleaving block uses the bank interleaving pattern shown in the thick dashed lines in the upper left corner of FIG. 15B, which cycles through all sixteen banks for the FLA data, and also for the first overflow pane data. FIG. 18C shows some conflicting and non-conflicting paths using sixteen dependent banks and the same conventions as FIG. 18A. Many conflicts remain between the edge subblocks even with such a large pixel interleaving blocks.

If four independent banks are available, each block uses the 2×2 pattern of FIG. 15C, replicated to create a 4×4 pattern.

Of course, the short-term buffering required with such large pixel interleaving blocks is quite large, and the risk of longer-term load imbalances among the memory controllers substantially increases.

Bank Interleaving When Overflow Panes Are Smaller than a Page

If overflow panes occupy less space than a page in a memory controller, the bank interleaving scheme must not introduce banking conflicts caused by a page in a memory controller conflicting with another page in the same bank. This possibility is introduced by the overflow panes. If multiple overflow panes are stored on a single page, it is unlikely that these panes represent physically adjacent rectangles on the screen. After pane allocation and deallocation has been underway for some time, overflow panes that are adjacent on the screen are allocated into essentially random pages of memory. Thus, if overflow panes that are adjacent on the screen are assigned to the same bank, the overflow panes will usually be allocated into different pages within the same bank, causing a conflict.

The simplest solution to this problem is to apply the previous banking assignment techniques on a pane level. However, this solution is non-optimal for accesses to the FLA, where physically adjacent panes are allocated to the same page. If the previously described banking assignments are performed on a pane basis, this reduces the average number of accesses to an FLA page that are closely spaced in time, which increases the probability that the page crossing overhead cannot be hidden, and so results in more stalls accessing the FLA data.

If overflow panes are smaller than a page, and if enough banks are available, the invention avoids this problem by assigning banks in the FLA on a page basis, and assigning banks for overflow panes on a pane basis. A group of panes that fit into an FLA page are all assigned to the same page in the FLA. The corresponding overflow panes are assigned into different banks, so that they avoid conflicts, when possible, with the FLA bank, with each other, and with neighboring FLA and overflow banks.

FIGS. 19A, 19B, 19C, and 20A, 20B, 20C show exemplary banking assignments where multiple overflow panes fit into a page. Each small square represents a pane assigned to a given memory controller. The top number is the bank assigned to the FLA, the bottom number is the bank assigned to the first overflow pane. Each larger rectangle or square, enclosed in thick lines, represents a page of data in the FLA, and so includes two panes (FIGS. 19) or four panes (FIGS. 20). Each such group of two or four panes is assigned the same page in the FLA.

FIG. 19A shows an assignment for 32 dependent banks and two overflow panes per page. The computation for the FLA and overflow banks are:

$$\text{fla\_bank} = (8*y_{pane}[1] + y_{pane}[2] + 2*x_{pane}[3:1])[3:0] + 16*y_{pane}[0]$$

$$\text{overflow}[1] = (8*y_{pane}[1] + y_{pane}[2] + 2*x_{pane}[3:1] + 8*x_{pane}[0] + 8)[3:0] + 16*y_{pane}[0]$$

FIG. 19B is for sixteen dependent banks and two overflow panes per page. The computation for the FLA and overflow banks are:

$$\text{fla\_bank} = (3*y_{pane}[1] + 2*x_{pane}[2:1])[2:0] + 8*y_{pane}[0]$$

$$\text{overflow}[1] = (3*y_{pane}[1] + 2*x_{pane}[2:1] + 4*x_{pane}[0] + 2)[2:0] + 8*y_{pane}[0]$$

FIG. 19C is for four independent banks and two overflow panes per page. The computation for the FLA and overflow banks are:

$$\text{fla\_bank} = (2*y_{pane}[0] + 3*x_{pane}[1])[1:0]$$

$$\text{overflow}[1] = (2*y_{pane}[0] + x_{pane}[1] + 2*x_{pane}[0] + 1)[1:0]$$

FIG. 20A is for 32 dependent banks and four overflow panes per page. The computation for the FLA and overflow banks are:

$$\text{fla\_bank} = (2*y_{pane}[2] + 9*y_{pane}[3] + 4*x_{pane}[2:1])[3:0] + 16*y_{pane}[1]$$

$$\text{overflow}[1] = (2*y_{pane}[2] + 9*y_{pane}[3] + 4*x_{pane}[2:1] + 4*y_{pane}[0] + 2*x_{pane}[0] + 4)[3:0] + 16*y_{pane}[1]$$

FIG. 19B is for sixteen dependent banks and four overflow panes per page. The computation for the FLA and overflow banks are:

$$\text{fla\_bank} = (2*y_{pane}[1] + 9*y_{pane}[2] + 4*x_{pane}[2:1])[3:0]$$

$$\text{overflow}[1] = (2*y_{pane}[1] + 9*y_{pane}[2] + 4*x_{pane}[2:1] + 4*y_{pane}[0] + 2*x_{pane}[0] + 6)[3:0]$$

FIG. 19C is for four independent banks and four overflow panes per page. The computation for the FLA and overflow banks are:

$$\text{fla\_bank} = (3*y_{pane}[1] + 2*x_{pane}[1])[1:0]$$

$$\text{overflow}[1] = (3*y_{pane}[1] + 2*y_{pane}[0] + 2*x_{pane}[0] + 1)[1:0]$$

The sixteen dependent banks pattern with four overflow panes per page has many more conflicts than simply assigning banks on a pane basis. There are simply too few banks to isolate conflicts effectively. In this case, the extra conflicts probably outweigh the advantages of allowing more accesses to each FLA page.

Although four independent banks is even fewer than sixteen dependent banks, this effect of "too few" banks does not carry through to this configuration.

In all cases, the banking assignments shown restrict conflicts as much as possible to be between two adjacent overflow pages, and to adjacent diagonal blocks. Of course, all these banking assignments will exhibit many more conflicts if medium-grain interleaving is used.

Bank Interleaving for Deeper Overflow Panes

If pixels in a pane require so many fragments that multiple overflow panes are required, the invention gives priority to assigning non-conflicting banks to the chain of overflow panes. Secondarily, at least the first few of the overflow panes should conflict with as few as possible of the FLA banks of immediate neighbors. Third, the two banks that conflict with the FLA should appear last.

For sixteen independent banks and the pane size a page, FIG. 15B shows that each FLA bank has a first overflow bank that is larger by form. A good assignment for the rest of the overflow pages is to make the second overflow bank to be larger (modulo 1) than the FLA, by two the third overflow bank larger by six, and then by eight, by ten by twelve and by fourteen. At this point all the even banks are used, so then cycle through the odd banks with 3 larger, etc. up to 17 larger. And then repeat the entire pattern.

For example, the cycle of banks used starting with bank 0 in the FLA is:

0, 4, 2, 6, 8, 10, 12, 14, 3, 5, 7, 9, 11, 13, 15, 1

The cycle starting with bank 9 in the FLA is:

9, 13, 11, 15, 1, 3, 5, 7, 12, 14, 0, 2, 4, 6, 8, 10

Similar cycles can be defined for the other banking schemes depicted in FIGS. 15 and 19.

Pane Allocation and Deallocation

When a pixel in a pane needs more fragments than can be contained in the corresponding FLA page and the overflow panes allocated thus far, the invention allocates a new overflow pane in the appropriate bank, and adds an appropriate entry to the FOM or LFOM. When the last pixel still using fragments in an overflow pane no longer needs the storage, the invention deallocates the overflow pane, and updates the appropriate entry in the FOM or LFOM. If a long fragment list is shortened by several fragments (that is, a new fragment completely obscures several existing fragments), several overflow panes may be deallocated.

Each memory controller maintains its memory independently from the other memory controllers. Further, because allocation of a pane in a specific bank should happen quickly, and not require a search through a long list of panes, panes in different banks are maintained independently. Thus, the invention maintains an overflow pane free list per bank per memory controller. The head pointer of each free list is maintained in a register inside the memory. Each overflow pane on a free list contains a pointer to the next overflow pane on the list. To allocate a new pane in a particular bank, the next pane pointer of the first pane on that bank's free list is loaded into the bank's free list pointer register. To deallocate a pane back into a particular bank's free list, the pane's next pane pointer is loaded with the free list's head pointer, and the head pointer is then loaded with the address of the pane.

While it is possible to put all of high memory on the free lists, this is undesirable, as it makes allocating a new off-screen buffer difficult. The memory needed for the buffer has to be painstakingly reclaimed from the free lists. Instead, each memory controller maintains a single limit pointer (for example, the pointer to the top of the LFOM) below which allocations cannot be made, and also maintains a low-water pointer for each free list.

Initially, all free lists have a head pointer of 0, and the low-water pointers are all initialized to point to the top word of memory (in their respective banks). When the invention attempts to allocate an overflow pane, but the corresponding free list is empty (has a head pointer of 0), it then tests the corresponding low-water pointer to see if it is above the limit pointer. If it is, it allocates a pane at the address of the low-water pointer, and then decrements the low-water pointer by the size of a pane. Otherwise, the allocation fails, and the pixel processor must merge or discard one of the fragments so that the list can fit in the existing storage available.

Since recycling of panes take place immediately, complex fragment lists that are then overwritten by a solid surface nearer to the eye give up their overflow storage for use elsewhere in a scene. Thus, the invention does not require as much memory to render an entire scene as prior art devices. In these devices recycling does not occur until a buffer is clear, so each fragment list keeps storage allocated for its maximum length in the entire scene.

A buffer or window clear operation sets each pixel's fragment list to length 0, and so all overflow panes associated with the pixel are deallocated. This overhead is relatively small, especially with overflow panes that contain fragment data for sixteen or more pixels. There is no need to specially treat overflow panes that contain pixels from more than one window. If one window is cleared, but another window has one or more pixels which require the overflow panes, then the required overflow panes won't be deallocated by the buffer clear operation.

Memory Compaction

At times an application may request that a new buffer be allocated in graphics memory. The invention itself it not directly responsible for such allocations, but merely provides the appropriate mechanisms for a software routine running on the CPU.

In the simplest case, there is sufficient free memory between the top of the LFOM and the lowest low-water mark in all the memory controllers. In this case the software memory manager moves the LFOM upward, and allocates the new buffer above the previous highest buffer. Note that since accesses to the LFOM are made relative to the top of the LFOM, entries in the LFOM need not change. Only the invention's pointer to the top of the LFOM changes.

If there is insufficient free memory between the top of the LFOM, and the lowest low-water mark in all of the memory controllers, but if there is sufficient memory if all the other off-screen buffers are compacted, and perhaps the LFOM is moved upward, a software memory manager running on the CPU copies buffers lower in memory, and the LFOM upward in memory.

If at least one low-water mark extends so low that the buffer allocation request cannot be satisfied even by compacting buffers, it may still be possible to satisfy the request if the overflow panes in upper memory are compacted so that each free list is empty and the low-water marks are as high as possible. Such compaction of free lists requires the software memory manager to copy overflow panes from one area of memory to another.

Pixel Processor Operation

Figure 21:
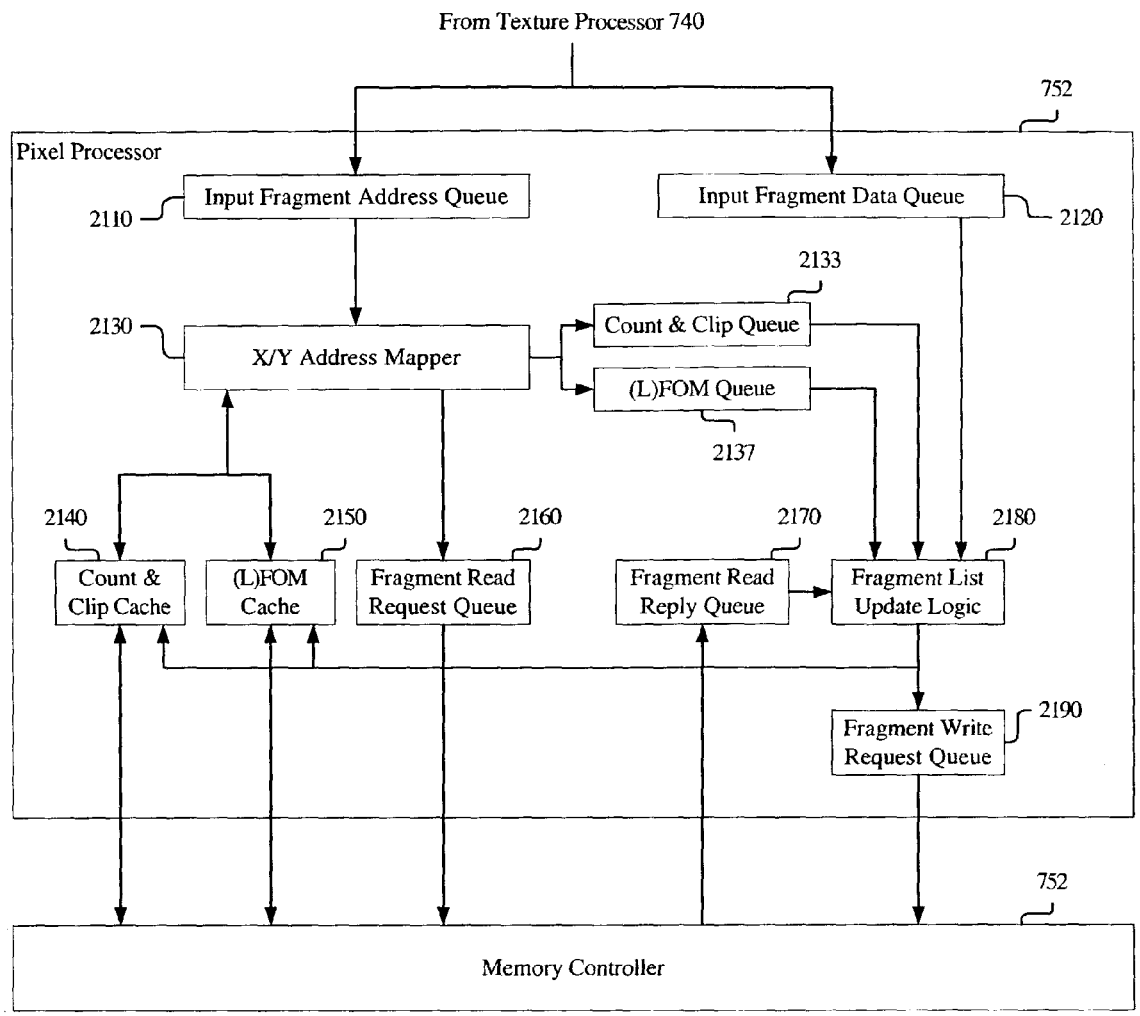
FIG. 21 is a block diagram of a pixel processor according to an embodiment of the invention.

FIG. 21 shows a block diagram of a pixel processor 752. Textured fragments from the texture processor 740 enter the pixel processor 752, and are split into two components. The various data fields to be used to update a pixel are appended to the end of the input fragment data queue 2120. The (x, y) address of the pixel within the memory controller is appended to the end of the input fragment address queue.

The (x, y) address at the head of the input fragment address queue 2110 is removed, and sent to the x/y address mapper 2130, when the mapper is ready to map a new address. The x/y address mapper 2130 performs all operations needed to generate the memory requests to fetch a pixel's fragments. It probes the count & clip cache 2140 to obtain the count of the number of fragments in use, as well as which window owns the pixel. If a different window owns the window from the window for which the fragment was generated, the x/y address mapper 2130 is done processing the pixel. Otherwise, it forwards the count & clip information to the count & clip queue 2133. If the pixel has one-or more fragments, the x/y address mapper 2130 computes the pixel's address in the fragment list array, and sends this address and the number of words to read to the fragment read request queue 2160. If the pixel has more fragments than are contained in the fragment list array entry, it also probes the (L)FOM cache 2150 to find the additional fragments, and sends these addresses and the number of words to read from each to the fragment read request queue 2160. As it generates requests for the FLA, the FOM, and the LFOM, it also sends this information to the (L)FOM queue 2137 for later use. The queues 2133 and 2137 include indices into the caches 2140 and 2150; any cache entry with an index in queues 2133 or 2137 is locked in the corresponding cache, so that these indices remain valid until all bookkeeping data associated with the fragment has been updated. Locking can be implemented, for example, by a reference count associated with each cache entry. Note that some operations, such as clearing a buffer, do not need to read a pixel's fragments, but still generate accesses to the FOM and LFOM, so that this bookkeeping data can be updated.

The count & clip cache 2140, and the (L)FOM cache 2150, are coupled to a memory controller 752, and can make requests to read or write entries through these connections.

The memory controller 752 attached to the pixel processor 752 eventually services the read request at the head of fragment read request queue 2160, and sends the appropriate fragment data back to fragment read reply queue.

The fragment list update logic 2180 performs several functions. It merges a pixel's existing fragments from the fragment read reply queue 2170 with a new fragment from input fragment data queue 2120, creating a new list that may contain any where from zero fragments, up to one more fragment than the old list. The new list is sent to the fragment write request queue 2190, using information from the (L)FOM queue 2137 and the count & clip queue 2133. If the new fragment list is shorter than the old fragment list, the fragment list update logic updates the caches 2140 and 2150 appropriately using information from the queues 2133 and 2137. These updates include writing new reference count information, as well as any deallocations of overflow pages that may be needed. If the new list is the same length as the old list, the caches 2140 and 2150 are not updated with any new data. If the new list is longer than the old list, then the updates to caches 2140 and 2150 may include an allocation of a new overflow page. In all three cases, even when the data in the cache is not changed, the fragment list update logic signals the caches 2140 and 2150 when it has finished using each cache entry, so that each such entry's reference count may be decremented, and the cache entry unlocked if the reference count becomes zero.

The foregoing descriptions of specific embodiments of the present invention are presented for purposes of illustration and explanation. The embodiments were chosen and described in order to best explain the principles of the invention and its practical applications, to thereby enable others skilled in the art to best utilize the invention. They are not intended to be exhaustive or to limit the invention to the precise forms disclosed. Various modifications may occur to those skilled in the art having the benefit of this disclosure without departing from the inventive concepts described herein.

What is claimed is:

1. A method, comprising:
statically allocating a portion of a memory to store a first pre-determined number of base fragments for each of a plurality of pixels;
storing base fragments in the statically allocated portion of memory;
dynamically allocating a portion of the memory for overflow panes of additional fragment storage, wherein the overflow panes each include storage for a second pre-determined number of fragments for each of a group of the pixels that are physically near each other in a coordinate system;
storing overflow panes in the dynamically allocated portion of memory;
maintaining address information of the overflow panes separately from fragment data comprising storing the address information in at least one array, each entry of which is associated with a group of the pixels and a group of fragments, each entry of the at least one array storing one of the addresses or a NULL value wherein the at least one array is indexed by at least part of the coordinates of the pixels and by a value representative of at least part of a fragment number;
retrieving the overflow panes from the dynamically allocated portion of memory using the maintained address information for rendering an image; and
rendering the image on a display.

2. The method of claim 1, wherein the value is computed as a remainder of dividing a fragment number by a predetermined integer.

3. A method, comprising:
statically allocating a portion of a memory to store a first pre-determined number of base fragments for each of a plurality of pixels;
storing base fragments in the statically allocated portion of memory;
dynamically allocating a portion of the memory for overflow panes of additional fragment storage, wherein the overflow panes each include storage for a second pre-determined number of fragments for each of a group of the pixels that are physically near each other in a coordinate system;
storing overflow panes in the dynamically allocated portion of memory;
maintaining address information of the overflow panes separately from fragment data wherein the maintaining step comprises storing the addresses in at least one linear fragment overflow map;
retrieving the overflow panes from the dynamically allocated portion of memory using the maintained address information for rendering an image; and
rendering the image on a display.

4. The method of claim 3, wherein the at least one linear fragment overflow map comprises an entry corresponding to a first memory location at which a first one of the overflow panes is stored, the entry storing a value representative of a second memory location at which a second one of the overflow panes is stored.

5. A method, comprising:
statically allocating a portion of a memory to store a first pre-determined number of base fragments for each of a plurality of pixels;
storing base fragments in the statically allocated portion of memory;
dynamically allocating a portion of the memory for overflow panes of additional fragment storage, wherein the overflow panes each include storage for a second pre-determined number of fragments for each of a group of the pixels that are physically near each other in a coordinate system wherein the statically allocating step and the dynamically allocating step comprise allocating conflicting banks of memory to store base fragments and overflow fragments for two groups of pixels provided that the two groups are physically far away from each other in the coordinate system;
storing overflow panes in the dynamically allocated portion of memory;
retrieving the base fragments from the statically allocated portion of memory and retrieving the overflow panes from the dynamically allocated portion of memory for rendering an image; and
rendering the image on a display.

6. A method, comprising:
statically allocating a portion of a memory to store a first pre-determined number of base fragments for each of a plurality of pixels;
storing base fragments in the statically allocated portion of memory;
dynamically allocating a portion of the memory for overflow panes of additional fragment storage, wherein the overflow panes each include storage for a second pre-determined number of fragments for each of a group of the pixels that are physically near each other in a coordinate system wherein the statically allocating step comprises allocating a bank of memory associated with a first memory controller to a first group of the pixels and allocating a bank of memory associated with a second memory controller to a second group of the pixels wherein the first group of pixels and the second group of pixels are dispersed across an area of the coordinate system;
storing overflow panes in the dynamically allocated portion of memory;
retrieving the base fragments from the statically allocated portion of memory and retrieving the overflow panes from the dynamically allocated portion of memory for rendering an image; and
rendering the image on a display.

7. A method, comprising:
statically allocating a portion of a memory to store a first pre-determined number of base fragments for each of a plurality of pixels;
storing base fragments in the statically allocated portion of memory;
dynamically allocating a portion of the memory for overflow panes of additional fragment storage, wherein the overflow panes each include storage for a second pre-determined number of fragments for each of a group of the pixels that are physically near each other in a coordinate system;
maintaining a fragment count value that indicates a number of fragments stored within the overflow pane;

wherein the dynamically allocating step comprises allocating an overflow pane to store a plurality of overflow fragments for a group of the pixels, and deallocating the overflow pane when the fragment count value for the overflow pane indicates that no pixel in the group requires storage for overflow fragments in the overflow pane;

retrieving the base fragments from the statically allocated portion of memory for rendering an image; and rendering the image on a display.

8. A computer graphics sub-system, comprising:

means for statically allocating a portion of a memory to store a first pre-determined number of base fragments for each of a plurality of pixels;

means for storing base fragments in the statically allocated portion of memory;

means for dynamically allocating a portion of the memory for overflow panes of additional fragment storage, wherein the overflow panes each include storage for a second pre-determined number of fragments for each of a group of the pixels that are physically pane to store a plurality of associated with the second memory controller for overflow panes of additional storage for the second group of the pixels;

means for storing overflow panes in the dynamically allocated portion of memory;

means for maintaining address information of the overflow panes separately from fragment data wherein the means for maintaining stores the address information in at least one array, each entry of which is associated with a group of the pixels and a group of fragments, each entry of the at least one array storing one of the addresses or a NULL value wherein the at least one array is indexed by at least part of the coordinates of the pixels and by a value representative of at least part of a fragment number;

means for retrieving the overflow panes from the dynamically allocated portion of memory using the maintained address information for rendering an image; and rendering the image on a display.

9. The computer graphics sub-system of claim 8, wherein the value is computed as a remainder of dividing a fragment number by a predetermined integer.

10. A computer graphics sub system, comprising:

means for statically allocating a portion of a memory to store a first pre-determined number of base fragments for each of a plurality of pixels;

means for storing base fragments in the statically allocated portion of memory;

means for dynamically allocating a portion of the memory for overflow panes of additional fragment storage, wherein the overflow panes each include storage for a second pre-determined number of fragments for each of a group of the pixels that are physically near each other in a coordinate system;

means for storing overflow panes in the dynamically allocated portion of memory;

means for maintaining address information of the overflow panes separately from fragment data wherein the means for maintaining stores the addresses in at least one linear fragment overflow map;

means for retrieving the overflow panes from the dynamically allocated portion of memory using the maintained address information for rendering an image; and means for rendering the image on a display.

11. The computer graphics sub-system of claim 10, wherein the at least one linear fragment overflow map comprises an entry corresponding to a first memory location at which a first one of the overflow panes is stored, the entry storing a value representative of a second memory location at which a second one of the overflow panes is stored.

12. A computer graphics sub-system, comprising:

means for statically allocating a portion of a memory to store a first pre-determined number of base fragments for each of a plurality of pixels;

means for storing base fragments in the statically allocated portion of memory;

means for dynamically allocating a portion of the memory for overflow panes of additional fragment storage, wherein the overflow panes each include storage for a second pre-determined number of fragments for each of a group of the pixels that are physically near each other in a coordinate system;

means for storing overflow panes in the dynamically allocated portion of memory;

wherein the means for statically allocating and the means for dynamically allocating allocate conflicting banks of memory to store base fragments and overflow fragments for two groups of pixels provided that the two groups are physically far away from each other in the coordinate system;

means for retrieving the base fragments from the statically allocated portion of memory;

means for retrieving the overflow panes from the dynamically allocated portion of memory for rendering an image; and means for rendering the image on a display.

13. A computer graphics sub-system, comprising:

means for statically allocating a portion of a memory to store a first pre-determined number of base fragments for each of a plurality of pixels; and means for storing base fragments in the statically allocated portion of memory;

means for dynamically allocating a portion of the memory for overflow panes of additional fragment storage, wherein the overflow panes each include storage for a second pre-determined number of fragments for each of a group of the pixels that are physically near each other in a coordinate system;

means for storing overflow panes in the dynamically allocated portion of memory;

wherein the means for statically allocating allocates a bank of memory associated with a first memory controller to a first group of the pixels and allocates a bank of memory associated with a second memory controller to a second group of the pixels wherein the first group of pixels and the second group of pixels are dispersed across an area of the coordinate system;

means for retrieving the base fragments from the statically allocated portion of memory;

means for retrieving the overflow panes from the dynamically allocated portion of memory for rendering an image; and means for rendering the image on a display.

14. A computer graphics sub-system, comprising:

means for static ally allocating a portion of a memory to store a first pre-determined number of base fragments for each of a plurality of pixels;

means for storing base fragments in the statically allocated portion of memory;

means for dynamically allocating a portion of the memory for overflow panes of additional fragment storage, wherein the overflow panes each include storage for a second pre-determined number of fragments for each of a group of the pixels that are physically near each other in a coordinate system;

means for maintaining a fragment count value that indicates a number of fragments stored within the overflow pane;

wherein the means for dynamically allocating comprises
means for allocating an overflow pane to store a plurality of overflow fragments for a group of the pixels, and means for deallocating the overflow pane which deallocates the overflow pane when the fragment count value for the overflow pane indicates that no pixel in the group requires storage for overflow fragments in the overflow pane;

means for retrieving the base fragments from the statically allocated portion of memory for rendering an image; and means for rendering the image on a display.

* * * * *

UNITED STATES PATENT AND TRADEMARK OFFICE
CERTIFICATE OF CORRECTION

PATENT NO. : 7,336,283 B2
APPLICATION NO. : 10/280721
DATED : February 26, 2008
INVENTOR(S) : Joel James McCormack et al.

It is certified that error appears in the above-identified patent and that said Letters Patent is hereby corrected as shown below:

On the Title page, in field (57), under "Abstract", in column 2, line 10, delete "modem" and insert -- modern --, therefor.

In column 28, line 46, delete "fla$_{13}$bank" and insert -- fla_bank --, therefor.

In column 37, line 45, in Claim 10, delete "sub system" and insert -- sub-system --, therefor.

In column 38, line 61, in Claim 14, delete "static ally" and insert -- statically --, therefor.

Signed and Sealed this

Twenty-second Day of July, 2008

JON W. DUDAS
*Director of the United States Patent and Trademark Office*